US012479219B2

(12) United States Patent
Tanaka

(10) Patent No.: US 12,479,219 B2
(45) Date of Patent: Nov. 25, 2025

(54) RECORDING DEVICE

(71) Applicant: SEIKO EPSON CORPORATION, Tokyo (JP)

(72) Inventor: Takuto Tanaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 168 days.

(21) Appl. No.: 18/455,326

(22) Filed: Aug. 24, 2023

(65) Prior Publication Data

US 2024/0066899 A1 Feb. 29, 2024

(30) Foreign Application Priority Data

Aug. 26, 2022 (JP) ................................ 2022-134724

(51) Int. Cl.

| | |
|---|---|
| ***B41J 2/165*** | (2006.01) |
| ***B41J 2/21*** | (2006.01) |
| ***B41J 11/00*** | (2006.01) |
| ***B41J 11/58*** | (2006.01) |
| ***B41J 25/00*** | (2006.01) |
| ***B41J 29/17*** | (2006.01) |

(52) U.S. Cl.

CPC ......... *B41J 25/001* (2013.01); *B41J 2/16508* (2013.01); *B41J 2/2142* (2013.01); *B41J 11/0045* (2013.01); *B41J 11/58* (2013.01); *B41J 29/17* (2013.01); *B41J 2/16523* (2013.01)

(58) Field of Classification Search

None

See application file for complete search history.

(56) References Cited

U.S. PATENT DOCUMENTS

2020/0047507 A1* 2/2020 Nakai .................. B41J 2/16588

FOREIGN PATENT DOCUMENTS

JP 2009-126123 A 6/2009

* cited by examiner

*Primary Examiner* — Scott A Richmond

(74) *Attorney, Agent, or Firm* — WORKMAN NYDEGGER

(57) ABSTRACT

A recording device includes a recording unit, a transport belt configured to support the medium, and a moving mechanism configured to move at least one of the recording unit or the transport belt with respect to the other in a movement direction. The recording device includes a cleaning unit provided in a manner movable forward and backward with respect to a position between the recording unit and the transport belt in a first direction intersecting the movement direction. The cleaning unit is configured to, when the recording unit is located at a to-be-cleaned position, start moving from a non-cleaning region and move in a cleaning region in the first direction, thereby cleaning the ejecting unit. A restriction portion configured to restrict movement of the cleaning unit is located in the non-cleaning region to the cleaning region when the cleaning unit does not perform cleaning.

12 Claims, 15 Drawing Sheets

RECORDING DEVICE

The present application is based on, and claims priority from JP Application Serial Number 2022-134724, filed Aug. 26, 2022, the disclosure of which is hereby incorporated by reference herein in its entirety.

BACKGROUND

1. Technical Field

The present disclosure relates to a recording device including a recording unit such as a recording head and a cleaning unit cleaning the recording unit.

2. Related Art

For example, JP-A-2009-126123 discloses an ink-jet recording device that includes a recording unit such as a recording head and that performs recording on a medium such as a transported sheet. A support portion configured to support the medium, such as a transport belt or a platen, is provided at a position facing the recording unit. In addition, this type of recording device includes a maintenance unit that performs maintenance on the recording unit. The maintenance unit performs a maintenance operation on the recording unit in a state of facing the recording unit. For this reason, it is necessary to move at least one of the recording unit or the maintenance unit to a position where both of these units face each other.

For example, a configuration in which a cap unit (an example of the cleaning unit) including a cap and a wiping portion moves is adopted in a line head recording device serving as the recording device disclosed in JP-A-2009-126123. The cap unit integrally includes the cap configured to cover an ink ejecting surface of the recording unit and the wiping portion configured to wipe ink from the ink ejecting surface. In addition, this type of recording device may include, in an individually movable manner, the cap unit (an example of a cap portion) including the cap and a wiper unit (an example of the cleaning unit) including the wiping portion. Note that at least one of the recording unit or the support portion is provided in a movable manner with respect to the other in a movement direction.

However, the cleaning unit may enter a movement region of the recording unit at a time other than maintenance. For example, when the cleaning unit moves from a retraction position by a predetermined distance due to vibration or inclination of the device, the cleaning unit may enter a movement region of at least one of the recording unit or the support portion. In addition, when an operator such as a user or a serviceperson accidentally touches the cleaning unit during maintenance, the cleaning unit may slightly enter the movement region of at least one of the recording unit or the support portion. In these cases, when at least one of the recording unit or the support portion moves, the moving one collides with the cleaning unit. When the collision occurs, at least one of the colliding members may be damaged or broken down, or when the posture is inclined as a result of the collision, for example, an abnormality such as tooth jump of a moving mechanism that can move the recording unit or the support portion may occur. Thus, a recording device is demanded in which collision between at least one of the recording unit or the support portion and the cleaning unit can be avoided.

SUMMARY

A recording device for solving the above problem includes a recording unit configured to perform recording on a medium by ejecting a liquid from an ejecting unit, a support portion configured to support the medium at a position facing the recording unit, a moving mechanism configured to move at least one of the recording unit or the support portion with respect to the other in a movement direction, a cleaning unit provided in a manner movable forward and backward with respect to a position between the recording unit and the support portion in a first direction intersecting the movement direction, the cleaning unit being configured to, when the recording unit is located at a to-be-cleaned position, start moving from a non-cleaning region and move in a cleaning region in the first direction, thereby cleaning the ejecting unit, and a restriction portion configured to restrict movement of the cleaning unit located in the non-cleaning region to the cleaning region when the cleaning unit does not perform cleaning.

DESCRIPTION OF EMBODIMENTS

An embodiment will be described below with reference to the accompanying figures. A recording device 11 is, for example, a multifunction machine. The recording device 11 has a plurality of functions including a scan function, a copy function, and a print function. In each drawing, it is assumed that the recording device 11 is placed at a horizontal installation surface. In a Z-axis orthogonal to the installation surface of the recording device 11, an upward direction is defined as a +Z direction, a downward direction is defined as a −Z direction, and two axes orthogonal to the Z-axis are defined as an X-axis and a Y-axis. An X-axis direction in parallel to the X-axis includes both a +X direction and a −X direction. A Y-axis direction in parallel to the Y-axis includes both a +Y direction and a −Y direction. A Z-axis direction in parallel to the Z-axis is also referred to as a vertical direction Z. The X-axis direction is also referred to as a width direction X because the X-axis direction is a width direction of a medium M.

Overall Configuration of Recording Device 11

Figure 1:
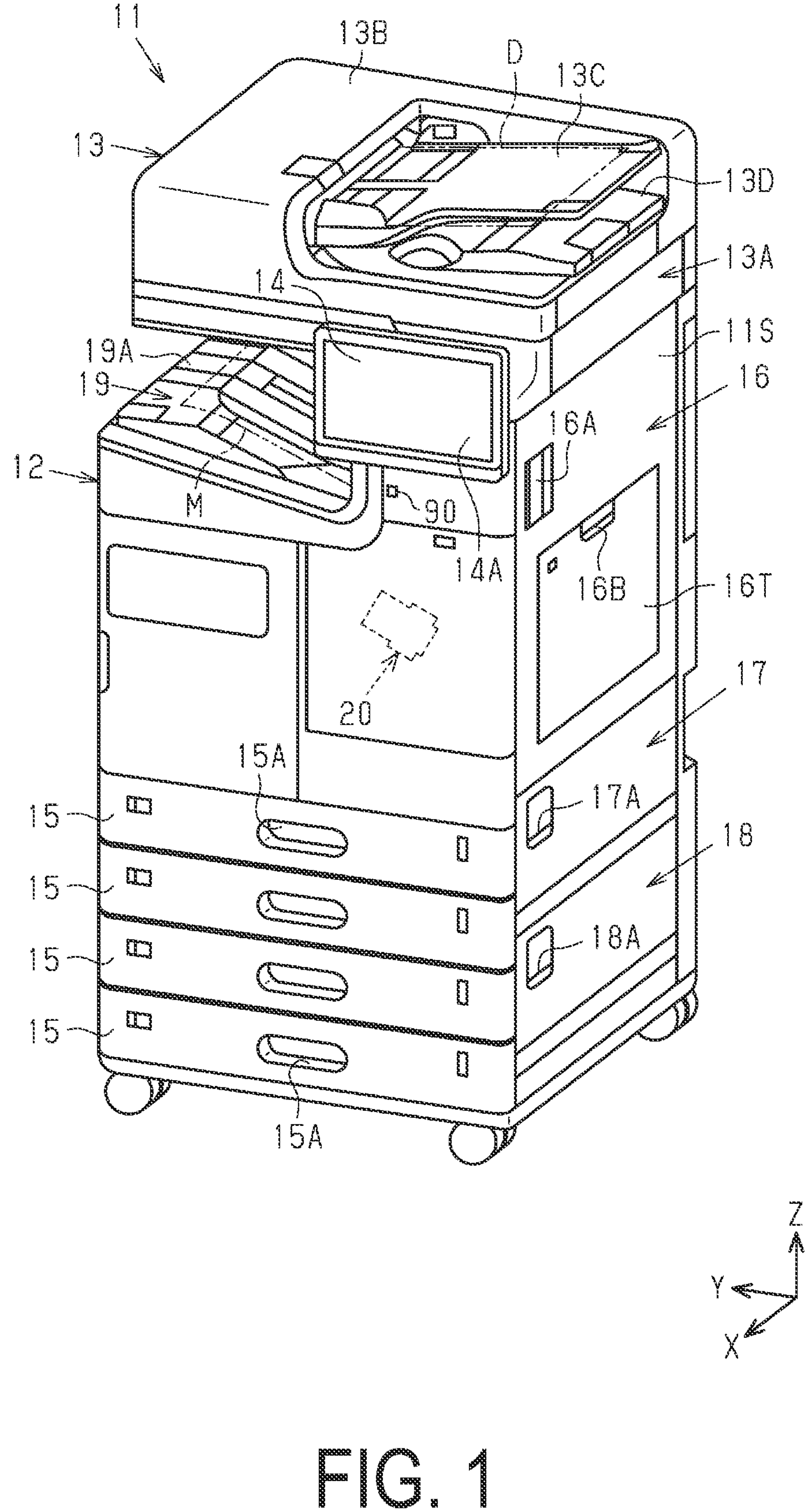
FIG. 1 is a perspective view illustrating a recording device according to an embodiment.

As illustrated in FIG. 1, the recording device 11 includes a device main body 12 having a rectangular parallelepiped shape and an image reading unit 13 disposed at an upper portion of the device main body 12. The device main body 12 includes a transport path T (see FIG. 2) along which the medium M such as a sheet is transported.

The image reading unit 13 includes a reading unit 13A and an automatic document feeding unit 13B. The automatic document feeding unit 13B feeds a document D placed at a document tray 13C to the reading unit 13A and also discharges the document D that has been read by the reading unit 13A to a discharge tray 13D. In addition, the reading unit 13A also has a flatbed reading function of reading the document D set on a document table exposed when the automatic document feeding unit 13B is opened, in addition to a feeding reading function of reading the document D being transported.

The recording device 11 may include an operation unit 14 at the device main body 12. The operation unit 14 may include a display unit 14A constituted by, for example, a touch panel. That is, a user may be capable of giving an instruction to the recording device 11 by performing a touch operation on the display unit 14A. In addition, the recording device 11 includes a power switch 90 operated when power is turned on or off. Note that the operation unit 14 may include an operation button.

The recording device 11 may include a cassette 15 capable of accommodating the plurality of media M. The cassette 15 may be provided in one or a plurality of stages (for example, four stages in FIG. 1). The cassette 15 is detachably inserted into a lower portion of the device main body 12 by being slid in the X-axis direction using a handle 15A. For example, the media M having different sizes or different types are accommodated in the plurality of cassettes 15.

Figure 2:
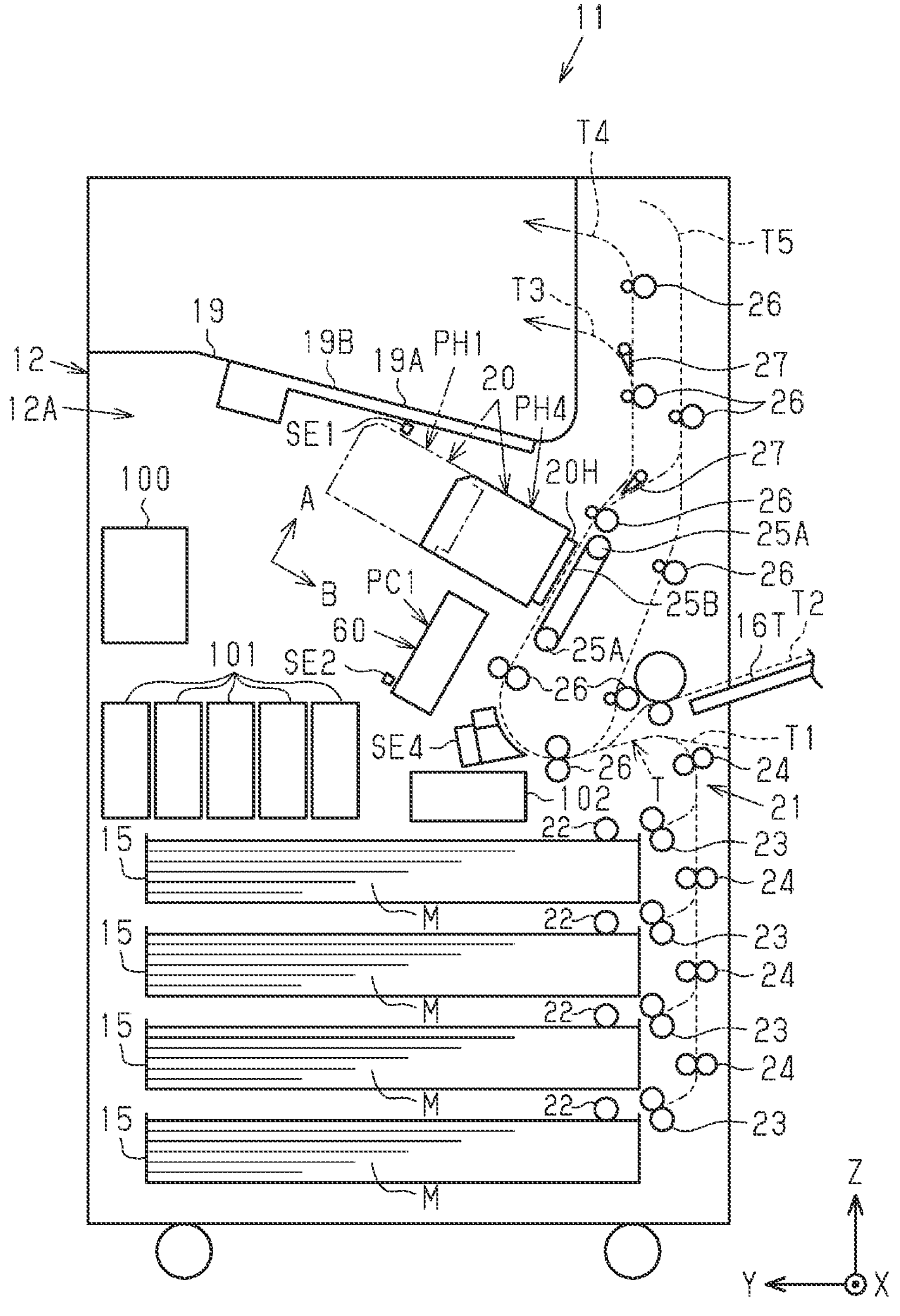
FIG. 2 is a schematic front-sectional view illustrating an internal configuration of the recording device.

As illustrated in FIGS. 1 and 2, the device main body 12 includes a plurality of cover doors 16 to 18 at a side surface 11S thereof. The cover doors 16 to 18 are rotatable so as to be brought into an open state where the transport path T (see FIG. 2) is exposed and a closed state where the transport path T is covered. The plurality of cover doors 16 to 18 include handles 16A to 18A for the user to perform opening and closing operations. The first cover door 16 includes a feeding tray 16T at which the medium M can be placed. The feeding tray 16T is attached to the first cover door 16 in an openable and closable manner. The feeding tray 16T includes a handle 16B for the user to perform opening and closing operations.

As illustrated in FIG. 1, the recording device 11 includes a recording unit 20 configured to perform recording on the medium M (see FIG. 2). The recording unit 20 performs recording on the medium M fed from each cassette 15 and the medium M fed from the feeding tray 16T.

A discharge portion 19 to which the medium M (see FIG. 2) after recording is discharged is provided between the device main body 12 and the image reading unit 13. The discharge portion 19 includes a discharge tray 19A at which the medium M discharged from the device main body 12 is stacked.

Internal Configuration of Recording Device 11

Next, an internal configuration of the recording device 11 will be described with reference to FIG. 2.

The recording device 11 includes, in the device main body 12, a transport unit 21 configured to transport the medium M and the recording unit 20 configured to perform recording on the medium M. The recording unit 20 includes an ejecting unit 20H ejecting a liquid such as ink. That is, the recording unit 20 performs recording on the medium M by ejecting the liquid from the ejecting unit 20H. The recording device 11 also includes a cap portion 60 and a cleaning unit 80 (see FIGS. 3 and 5) as a maintenance unit configured to perform maintenance on the recording unit 20.

The transport unit 21 includes the transport path T along which the medium M is transported, which is indicated by a broken line in FIG. 2. The AB coordinate system illustrated on a YZ plane is an orthogonal coordinate system. An A direction is equal to a transport direction of the medium M at a recording position facing the recording unit 20. An upstream direction of the A direction will be referred to as a −A direction, and a downstream direction thereof will be referred to as a +A direction. In the present embodiment, the A direction is a direction inclined such that advancing in the +A direction results in advancing in the −Y direction and in the +Z direction. Specifically, the A direction is inclined in a range of 30° to 80° relative to the horizontal direction, and in particular, the A direction is inclined at substantially 60° relative to the horizontal direction in FIG. 2. In this manner, the A direction is a direction where the transport direction of the medium M intersects both the horizontal direction and the vertical direction Z at an acute angle.

As illustrated in FIG. 2, the recording unit 20 is provided in a movable manner in the B direction, which is a direction facing a transport belt 25B serving as an example of the support portion configured to support the medium M at the recording position. The transport belt 25B supports the medium M at a position facing the recording unit 20. A movement direction of the recording unit 20 according to the present embodiment is the B direction inclined by a predetermined angle with respect to the horizontal plane. That is, the B direction is a movement direction when the recording unit 20 moves forward and backward with respect to the transport belt 25B. As to the B direction, a direction in which the ejecting unit 20H moves close to the transport belt 25B is referred to as a +B direction, and a direction in which the ejecting unit 20H moves away from the transport belt 25B is referred to as a −B direction. The B direction is such a direction that advancing in the +B direction results in advancing in the −Y direction and in the +Z direction. The B direction of the present embodiment is orthogonal to the A direction on the YZ plane.

The recording unit 20 is configured to be moved between a replacement position PH1 indicated by a chain double-dashed line in FIG. 2 and a recording position PH4 indicated by a solid line in FIG. 2. The recording unit 20 can move to a plurality of positions including at least the replacement position PH1 and the recording position PH4 by moving in the +B direction from the replacement position PH1. Note that in the present example, the B direction, which is the movement direction of the recording unit 20, is also referred to as a movement direction B.

The recording position PH4 is a position at which the ejecting unit 20H performs recording by ejecting a liquid such as ink to the medium M. The replacement position PH1 is a position where a user, a serviceperson, or the like replaces the recording unit 20 for maintenance or the like. A first sensor SE1 capable of detecting the recording unit 20 at the replacement position PH1 may be provided in the device main body 12. The replacement position PH1 detected by the first sensor SE1 also serves as an origin position when the position of the recording unit 20 on a movement path is measured.

The discharge portion 19 includes a spatial portion in which the medium M stacked at a placement surface 19B of the discharge tray 19A is accommodated. In addition, the plurality of cassettes 15 disposed at the lower portion of the device main body 12 each accommodate the medium M. The medium M accommodated in each cassette 15 is transported along the transport path T by a pickup roller 22 and a transport roller pair 23 and 24. In the transport path T, a transport path T1 extending from an external device and a transport path T2 extending from the feeding tray 16T provided at the device main body 12 join together.

At positions along the transport path T, the transport belt 25B, a plurality of transport roller pairs 26, a plurality of flaps 27, and a medium width sensor SE4 configured to detect the width of the medium M in the X direction are disposed. The transport belt 25B is wound around a pair of rollers 25A. The front surface of the transport belt 25B facing the recording unit 20 corresponds to a support surface configured to support the medium M at the recording position. Each flap 27 has a function of switching a path along which the medium M is transported.

The transport path T forms a curved portion in a region facing the medium width sensor SE4, and extends in the A direction in a region downstream of this curved portion. A transport path T3 and a transport path T4 extending toward the discharge portion 19, and an inversion path T5 for inverting the front and back of the medium M are provided downstream of the transport belt 25B in the transport path T. The discharge portion 19 may be provided with a discharge tray (not illustrated) so as to fit the transport path T4. Note that the inversion path T5 is a path along which the medium M on which recording on a first surface has been completed is transported before recording on a second surface when double-sided recording is performed. The medium M on which the recording on the first surface has been completed and which has been inverted in the inversion path T5 is transmitted to the recording position along the transport path T again, whereupon recording is performed on the second surface. Note that the transport belt 25B may cause the medium M to adhere thereto. In this case, an air sucking method, an electrostatic chucking method, or the like can be employed as the adhesion method.

The recording unit 20 includes the ejecting unit 20H ejecting ink. The ejecting unit 20H is disposed to face the transport belt 25B in the B direction. The recording unit 20 records information onto the medium M by ejecting ink from the ejecting unit 20H. The ejecting unit 20H according to the present embodiment is a line head ejecting unit including a plurality of nozzles capable of simultaneously performing recording in a range covering the entire region of the medium M in the width direction X. The recording unit 20 performs recording on the entire region of the medium M in the width direction without movement of the medium M in the width direction X. However, the recording unit 20 is not limited thereto and may be of a serial recording type in which the recording unit 20 is mounted at a carriage and ejects ink while moving in the width direction X of the medium M.

As illustrated in FIG. 2, the recording device 11 includes the cap portion 60 configured to perform maintenance on the recording unit 20. The cap portion 60 is provided in a manner movable forward and backward with respect to a position between the recording unit 20 and the transport belt 25B in the A direction intersecting the movement direction B. In the present embodiment, the A direction, which is the movement direction of the cap portion 60, is referred to as a second direction. The cap portion 60 covers the ejecting unit 20H when the recording unit 20 is located at a retraction position PH3. Note that in the present example, the A direction is also referred to as a second direction A.

The cap portion 60 is configured to be moved between a retraction position PC1 and a cap position PC2 (see FIG. 13) moved from the retraction position PC1 in the +A direction. The recording unit 20 is movable to a to-be-cleaned position PH2 (see FIG. 13) retracted from the recording position PH4 by a predetermined distance in the −B direction. The cap portion 60 performs capping for covering the ejecting unit 20H at the retraction position PH3 (see FIG. 12) slightly lowered from the to-be-cleaned position PH2. The cap portion 60 performs maintenance on the ejecting unit 20H at the cap position PC2. While the recording device 11 is performing a recording operation, the cap portion 60 is on standby at the retraction position PC1. Note that the to-be-cleaned position PH2 is a position of the recording unit 20 when the cleaning unit 80 (see FIG. 3) cleans the ejecting unit 20H. Thus, a position to which the recording unit 20 is retracted in the −B direction in order for the cap portion 60 to move between the retraction position PC1 and the cap position PC2 may be a position other than the to-be-cleaned position PH2 as long as cleaning is not intended.

Further movement of the cap portion 60 in the −A direction is restricted at the end of a movement path, that is, at the retraction position PC1. A second sensor SE2 capable of detecting the cap portion 60 at the retraction position PC1 may be provided in the device main body 12. The position of the cap portion 60 that has reached the end, which is detected by the second sensor SE2, is set as an origin position when the position of the cap portion 60 on the movement path is measured. Note that the maintenance performed by the cap portion 60 will be described in detail later. The cleaning unit 80 (see FIG. 3) will be also described in detail later.

The recording device 11 also includes a control unit 100 controlling the recording device 11. In addition, a liquid accommodation unit 101 accommodating a liquid such as ink and a waste liquid storage unit 102 storing a waste liquid such as ink are provided in the device main body 12. The liquid accommodation unit 101 supplies the liquid such as ink to the ejecting unit 20H via a tube (not illustrated). The ejecting unit 20H ejects the liquid such as ink supplied from the liquid accommodation unit 101. The control unit 100 performs initialization processing based on detection signals and the like input from the sensors SE1 to SE3 and the like (see FIG. 11) configured to detect the origin positions.

The discharge tray 19A illustrated in FIG. 2 is configured to be removed from the device main body 12. The recording unit 20 is replaced through an insertion port exposed when the discharge tray 19A is removed. In addition, the cap portion 60 is also replaced through the same insertion port. When receiving a replacement instruction of the recording unit 20, the control unit 100 moves the recording unit 20 to the replacement position PH1. Further, when receiving a replacement instruction of the cap portion 60, the control unit 100 moves the cap portion 60 to a replacement position PC3.

The control unit 100 performs an initialization operation when an abnormality occurs. In the initialization operation, an origin setting operation is performed in which the recording unit 20, the cap portion 60, and the cleaning unit 80 (see FIG. 4) are moved along paths passing through, for example, the replacement position PH1, the retraction position PC1, and a retraction position PW1, which are the respective origin positions, and the origin positions at which the sensors SE1, SE2, and SE3 are turned on are searched for. Counters 111 to 113 and the like (see FIG. 11) are reset when the respective units are at the origin positions detected by the origin setting operation. Thereafter, as the recording unit 20, the cap portion 60, and the cleaning unit 80 move, the counters 111 to 113 count, for example, pulse edges of detection signals from three encoders 91 to 93 (see FIG. 11) configured to detect the respective positions. Accordingly, the counters 111 to 113 counts the count values indicating the respective positions of the recording unit 20, the cap portion 60, and the cleaning unit 80. Note that the origin positions may be changed as appropriate.

The control unit 100 according to the present embodiment does not perform the initialization processing at power-on. This is to shorten a waiting time from a power-on operation to recording start. However, when an abnormality such as a medium jam occurs, the control unit 100 performs the initialization processing including the origin setting operation. Note that the control unit 100 may perform the initialization processing including the origin setting operation at power-off. This is because it can be said that the user is basically not kept waiting even when the initialization processing is performed at power-off. Here, in addition to a medium jam, a time when an overload is detected during movement of the recording unit 20, a time when an overload is detected during movement of the cap portion 60, a time when an overload is detected during movement of the cleaning unit 80, and the like are considered as abnormal events for performing the initialization processing.

Configuration of Motion Unit 30

Next, a configuration of a motion unit 30 will be described with reference to FIG. 3.

Figure 3:
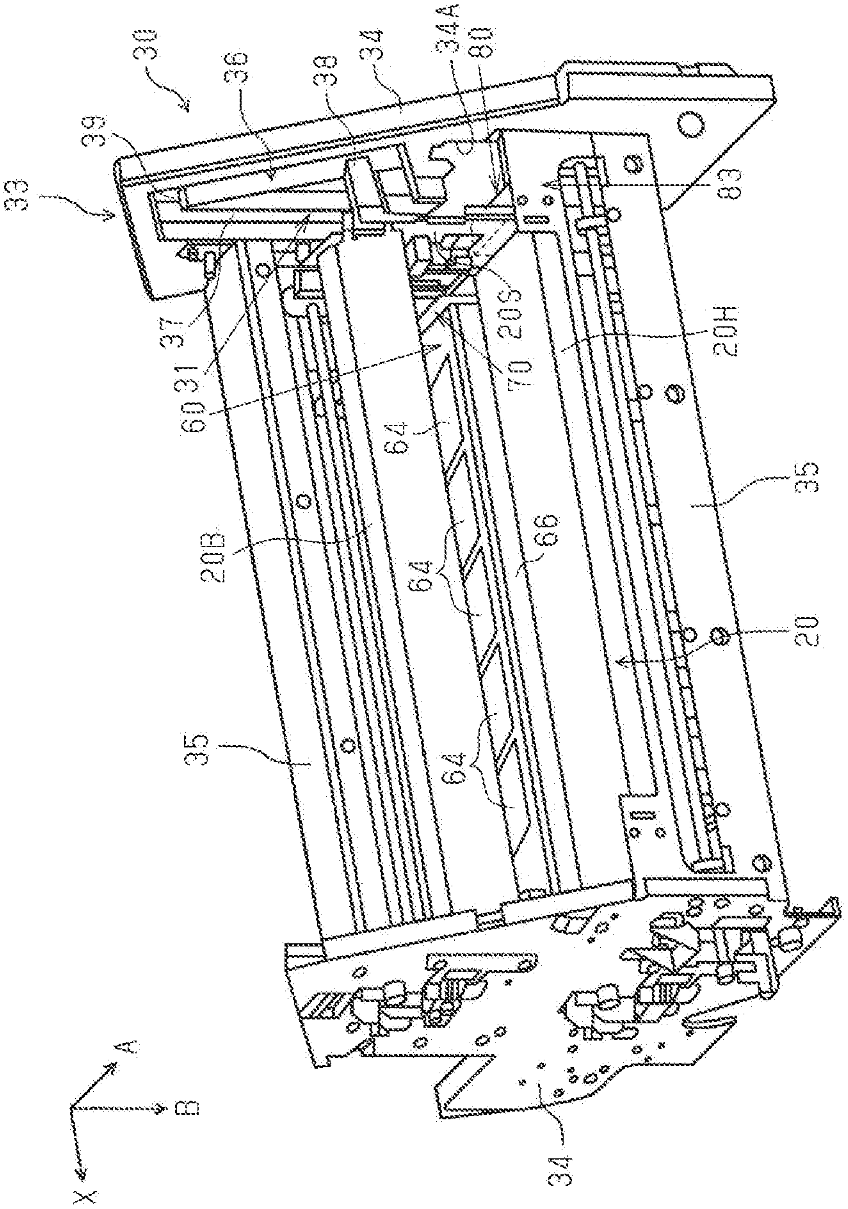
FIG. 3 is a perspective view illustrating a motion unit.

As illustrated in FIG. 3, the recording device 11 includes the motion unit 30 illustrated in FIG. 3 in the device main body 12. The motion unit 30 includes a main body frame 33 constituting a main body. The main body frame 33 includes a pair of side frames 34 and 34 facing each other at a predetermined distance in the X-axis direction, and a plurality of horizontal frames 35 coupling the pair of side frames 34 and 34. As illustrated in FIG. 3, each of the pair of side frames 34 and 34 is configured as a side plate having a surface (side surface) along the AB plane. One of the side frames 34 is disposed on the +X direction side, and the other side frame 34 is disposed on the −X direction side.

The motion unit 30 includes a first moving mechanism 31 (see FIG. 6) as a moving mechanism configured to move the recording unit 20 in the movement direction B. The motion unit 30 further includes a second moving mechanism 70 (see FIG. 6) configured to move the cap portion 60 in the second direction A, and a third moving mechanism 83 (see FIG. 8) configured to move the cleaning unit 80 in a first direction X. The motion unit 30 is a unit obtained by integrally assembling the three types of moving mechanisms 31, 70, and 83 capable of moving movement targets in three movement directions intersecting each other.

The first moving mechanism 31 moves one of the recording unit 20 or the transport belt 25B with respect to the other in the movement direction B. In the present embodiment, the recording unit 20 is configured to be moved in the movement direction B, and the transport belt 25B is fixed at a predetermined position facing the recording unit 20 in the movement direction B. The transport belt 25B disposed at the predetermined position functions as the support portion configured to support the medium M at the recording position facing the recording unit 20. Thus, the first moving mechanism 31 moves the recording unit 20 with respect to the transport belt 25B functioning as the support portion in the movement direction B.

A guide member 36 configured to guide the recording unit 20 in a movable manner in the movement direction B is assembled to each of two inner surfaces of the pair of side frames 34 and 34 facing each other. The two guide members 36 are disposed substantially symmetrically with respect to the center of the main body frame 33 in the X direction. Thus, the guide member 36 on the −X direction side will be described, and a description of the guide member 36 on the +X direction side will be omitted.

Figure 6:
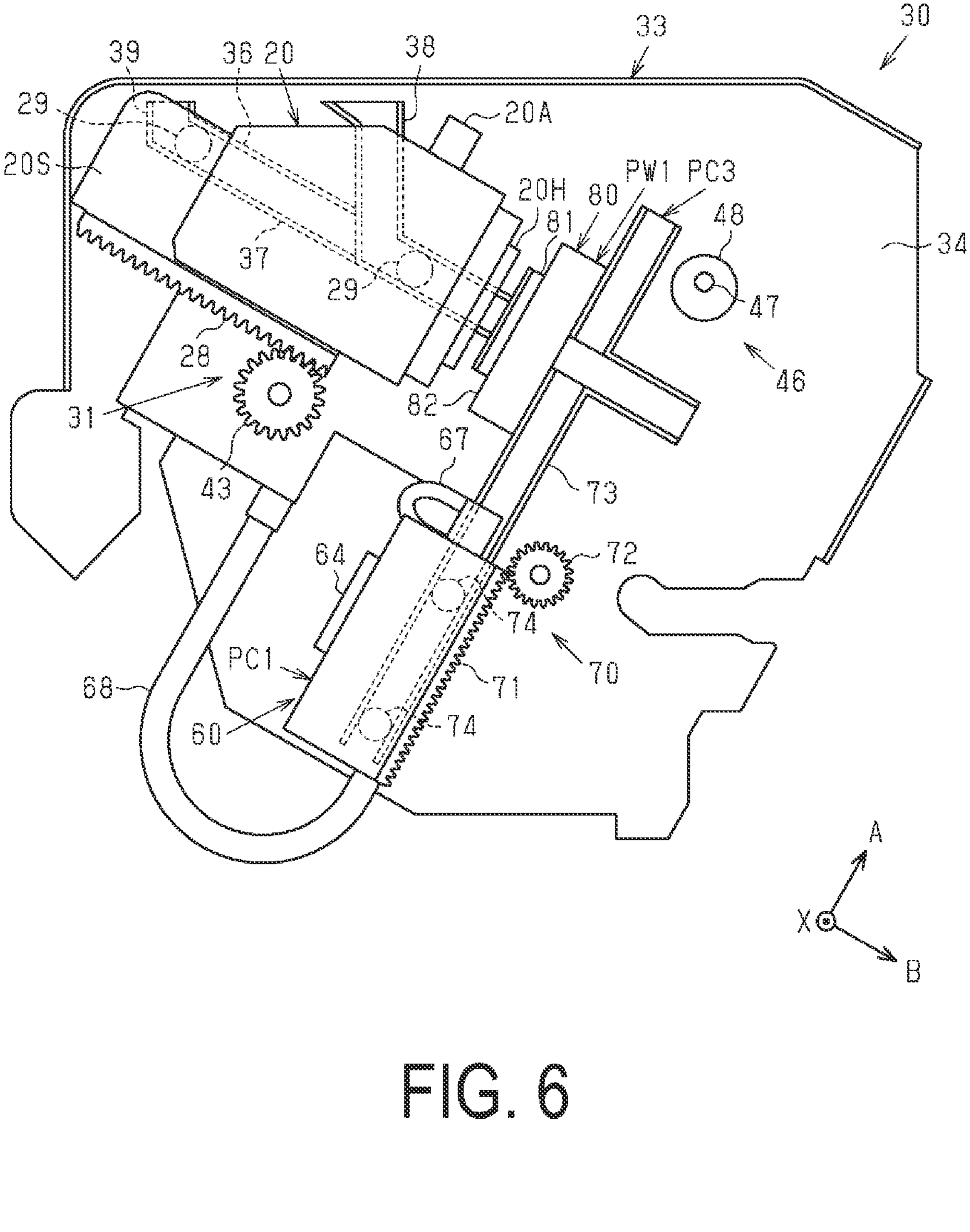
FIG. 6 is a front view illustrating the motion unit.

As illustrated in FIGS. 3 and 6, the guide member 36 includes a guide rail 37 extending in the movement direction B and guide rails 38 and 39 branching off from a middle portion of the guide rail 37 and extending in the Z direction. Each of the guide rails 37 to 39 is a groove-shaped rail opening in the +X direction. A guide roller 29 (see FIG. 6) of the recording unit 20 is inserted into the groove of the guide rail 37. The guide rail 37 guides the recording unit 20 in the movement direction B.

The recording unit 20 includes a pair of side plates 20S, the ejecting unit 20H supported by the pair of side plates 20S, and a bar member 20B coupling the pair of side plates 20S at end portions in the −B direction. The plurality of guide rollers 29 such as rollers attached to both outer sides of the pair of side plates 20S are guided by the guide rails 37, and thus the recording unit 20 is assembled to the main body frame 33 in a state of being movable in the movement direction B. The pair of guide rails 37 (only one of which is illustrated in FIG. 3) are assembled to the inner surfaces of the pair of side frames 34 so as to extend in the movement direction B. The first moving mechanism 31 includes a rack-and-pinion mechanism including a rack 28 assembled to the recording unit 20 and a pinion 43 fixed to the main body frame 33 (regarding both components, see FIG. 6), and an elevation motor 41 (see FIG. 11), which is a driving source for rotating the pinion 43.

The recording unit 20 is guided by the guide rail 37 to move to one or more positions separated from the transport belt 25B with respect to the recording position. Specifically, the recording unit 20 can move to a plurality of stopping positions such as the recording position PH4, the retraction position PH3, the to-be-cleaned position PH2, a flushing position (not illustrated), and the replacement position PH1 by moving along the guide rail 37.

When the recording unit 20 is located at the replacement position PH1 on the guide rail 37, the recording unit 20 can be guided to the guide rails 38 and 39 for replacement. In the recording device 11, an operator such as a user or a serviceperson can remove the recording unit 20 from the device main body 12 for maintenance or replace the recording unit 20 with a new one. The operator can replace the recording unit 20 through the insertion port exposed when the discharge tray 19A is removed.

The second moving mechanism 70 moves the cap portion 60 in the second direction A. The control unit 100 controls operations of the first moving mechanism 31 and the second moving mechanism 70. The motion unit 30 supports the recording unit 20 in a movable manner in the movement direction B. In addition, the motion unit 30 supports the cap portion 60 in a movable manner in the second direction A. Further, the motion unit 30 supports the cleaning unit 80 in a movable manner in the first direction X.

Figure 4:
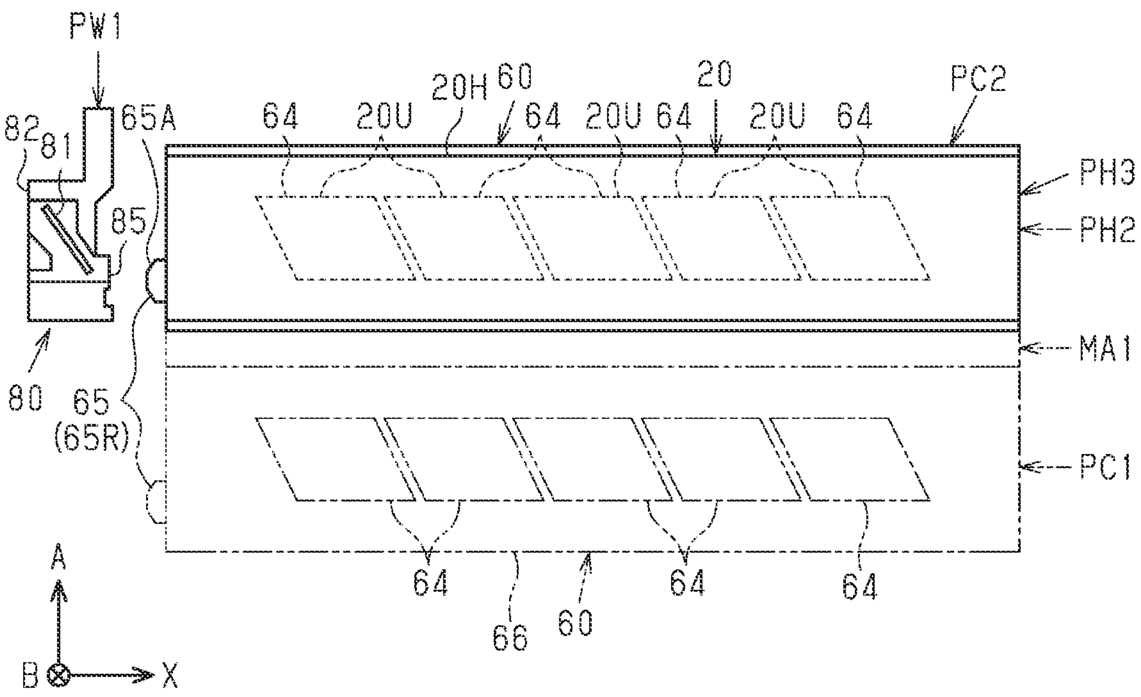
FIG. 4 is a schematic plan view for describing an operation of a cap portion as viewed from a B direction.

The cap portion 60 moves in the A direction from the retraction position PC1 illustrated in FIG. 4 to the cap position PC2 facing the ejecting unit 20H. The cap portion 60 performs capping and cleaning on the ejecting unit 20H at the cap position PC2. The cap portion 60 includes a plurality of caps 64 used for capping for covering the ejecting unit 20H. Note that detailed operations of the capping and cleaning performed on the recording unit 20 by the cap portion 60 will be described later.

The cleaning unit 80 is provided in a movable manner in the first direction X orthogonal to the B direction and the A direction. The cleaning unit 80 is on standby at the retraction position PW1 illustrated in FIGS. 4 and 5 and moves from the retraction position PW1 in the first direction X to clean the ejecting unit 20H. Note that the first direction X is the X-axis direction in the present example but may be a direction other than the X-axis direction as long as cleaning can be performed without interference with the cap portion 60. Note that in FIG. 3, a through hole 34A into which the cleaning unit 80 can be inserted when the cleaning unit 80 moves from the retraction position PW1 to a cleaning region WA that can be cleaned is formed in the other side frame 34.

Operation of Cap Portion 60

Next, an operation of the cap portion 60 will be described with reference to FIGS. 4 and 5. The cap portion 60 includes the plurality of caps 64 and a cap carriage 66 holding the plurality of caps 64. The ejecting unit 20H constituting the recording unit 20 includes a plurality of unit heads 20U. The ejecting unit 20H is a line head and includes the plurality of unit heads 20U over a range corresponding to the maximum width of the medium M. The cap portion 60 includes the caps 64 capable of covering the ejecting unit 20H. Since the recording unit 20 is a line head including the plurality of the ejecting units 20H, the cap portion 60 according to the present embodiment includes the plurality of caps 64 capable of covering the plurality of ejecting units 20H to bring the plurality of ejecting units 20H into a capping state.

The cap portion 60 in on standby at the retraction position PC1. The cap portion 60 can move in the second direction A. The cap portion 60 moves from the retraction position PC1 to the cap position PC2. In this state, the recording unit 20 moves in the +B direction, and thus the plurality of unit heads 20U included in the ejecting unit 20H are capped by the plurality of caps 64.

As illustrated in FIG. 3, the cap portion 60 cleans the ejecting unit 20H. The cap portion 60 includes the caps 64 illustrated in FIGS. 3 and 4. In a capping state where the cap portion 60 is in contact with the ejecting unit 20H, the cap portion 60 forcibly discharges a waste liquid such as thickened ink or ink containing bubbles in each nozzle. Clogging of the nozzle is prevented or eliminated by cleaning the nozzle.

Operation of Cleaning Unit 80

Next, an operation of the cleaning unit 80 will be described with reference to FIG. 5.

Figure 5:
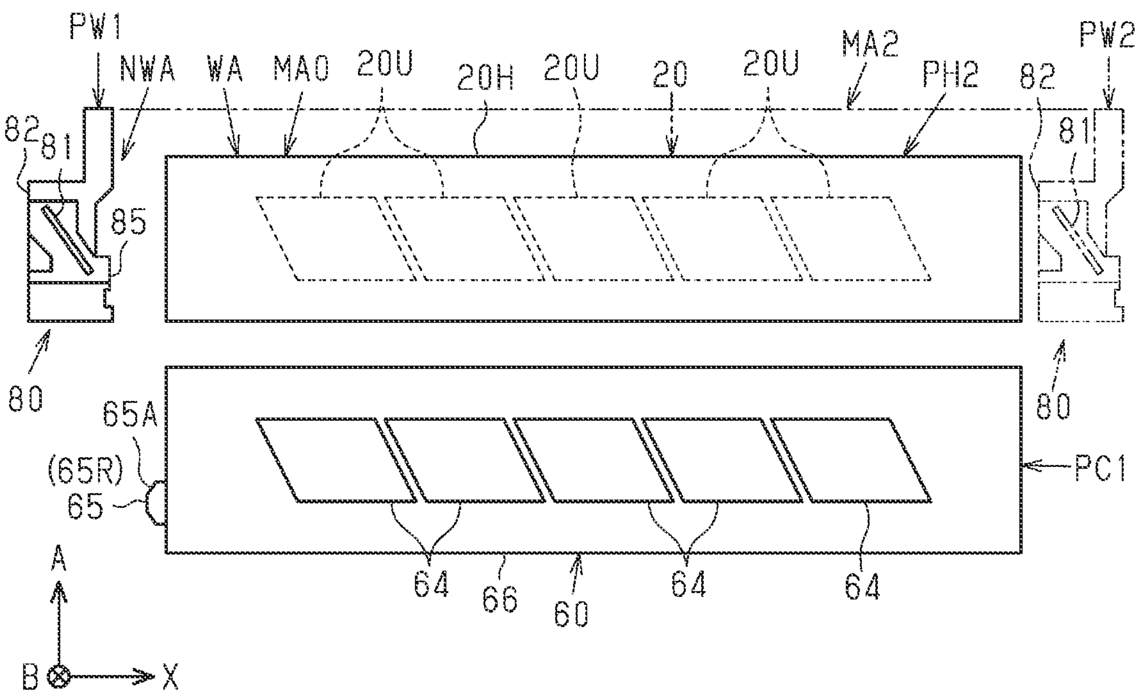
FIG. 5 is a schematic plan view for describing an operation of a cleaning unit as viewed from the B direction.

As illustrated in FIG. 5, the cleaning unit 80 cleans the ejecting unit 20H. The cleaning unit 80 is provided in a manner movable forward and backward with respect to a position between the recording unit 20 and the transport belt 25B in the first direction X intersecting the movement direction B. When the recording unit 20 is located at the to-be-cleaned position PH2, the cleaning unit 80 starts moving from a non-cleaning region NWA and moves in the cleaning region WA in the first direction X, thereby cleaning the ejecting unit 20H. The cleaning unit 80 performs wiping as the cleaning of the ejecting unit 20H. When not performing cleaning, the cleaning unit 80 is on standby in the non-cleaning region NWA illustrated in FIG. 5. When the recording unit 20 is located at the to-be-cleaned position PH2, the cleaning unit 80 moves from the non-cleaning region NWA to the cleaning region WA and moves in the cleaning region WA in the first direction X, thereby cleaning the ejecting unit 20H. When the cleaning unit 80 moves to an inversion position PW2 indicated by a chain double-dashed line, which is a position opposite to the retraction position PW1 across the cleaning region WA, the cleaning unit 80 stops. Next, the cleaning unit 80 moves backward in the first direction X from the inversion position PW2 and returns to the retraction position PW1. In this way, the cleaning unit 80 cleans the ejecting unit 20H in the cleaning region WA in the course of moving from the retraction position PW1 in the +X direction. After the cleaning of the ejecting unit 20H is completed, the recording unit 20 slightly retracts in the −B direction and then the cleaning unit 80 returns to the retraction position PW1 by moving from the inversion position PW2 in the −X direction. Thus, the cleaning unit 80 cleans the ejecting unit 20H in the forward movement of moving in the +X direction, and returns to the retraction position PW1 in a state of being separated from the ejecting unit 20H in the backward movement of moving in the −X direction.

As illustrated in FIG. 5, the cleaning unit 80 includes a wiper 81 and a wiper carriage 82. When the wiper carriage 82 moves in the width direction X, the wiper 81 wipes the ejecting unit 20H. In detail, nozzle surfaces 20N of the plurality of unit heads 20U are wiped by the wiper 81. Each nozzle surface 20N is a surface where the nozzle is opened.

Moving Mechanisms of Recording Unit 20 and Cap Portion 60

Next, moving mechanisms of the recording unit 20 and the cap portion 60 will be described with reference to FIG. 6. As illustrated in FIG. 6, the motion unit 30 includes the first moving mechanism 31 configured to move the recording unit 20 in the movement direction B intersecting the nozzle surface 20N. The first moving mechanism 31 is, for example, a rack-and-pinion mechanism. In this example, the first moving mechanism 31 includes, for example, the pinion 43 (driving gear), the rack 28, and the elevation motor 41, which is a driving source rotating the pinion 43. The length of the rack 28 is longer than the length of one turn of the pinion 43. The elevation motor 41 is driven, and thus the recording unit 20 moves in the B direction via the first moving mechanism 31. The recording unit 20 moves in the B direction while being guided by the guide rail 37 extending in the B direction. The first moving mechanism 31 moves the recording unit 20 up and down in the B direction (±B direction).

Figure 7:
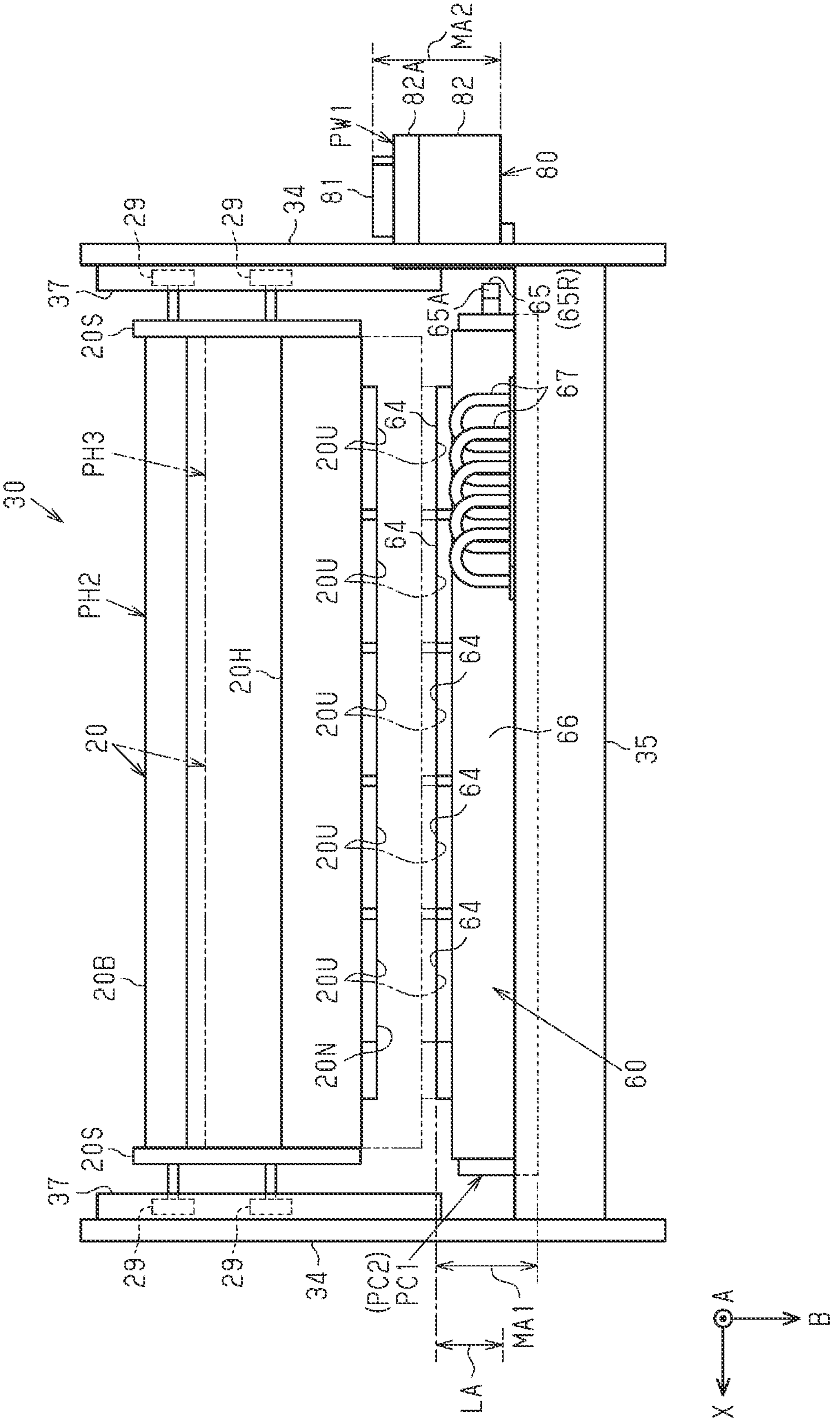
FIG. 7 is a view illustrating the motion unit as viewed from downstream in an A direction.

As illustrated in FIGS. 6 and 7, the plurality of guide rollers 29 constituted of rollers are rotatably provided at each side surface of the recording unit 20. Since the plurality of guide rollers 29 are guided by the guide rail 37, the recording unit 20 moves in the movement direction B along the guide rail 37.

The cap portion 60 illustrated in FIG. 6 performs capping of the ejecting unit 20H and maintenance of the ejecting unit 20H. The cap portion 60 performs capping for covering the nozzle surfaces 20N of the ejecting unit 20H with the plurality of caps 64. The recording unit 20 includes a plate portion 20A protruding from a side surface. An eccentric cam 48 fixed to a rotary shaft 47 is located on an extension line of the B direction of the plate portion 20A. The recording unit 20 is disposed at the recording position PH4 by moving in the +B direction to a position where the plate portion 20A comes into contact with the eccentric cam 48. The gap between the transport belt 25B and the nozzle surfaces 20N when the recording unit 20 is disposed at the recording position PH4 is adjusted according to the rotational position of the eccentric cam 48. As described above, in the present embodiment, the plate portion 20A, the rotary shaft 47, the eccentric cam 48, and the like constitute an adjusting unit 46 adjusting the gap.

The cap portion 60 is provided in a movable manner in the second direction A intersecting (for example, orthogonal to) the B direction, which is the movement direction of the recording unit 20. The cap portion 60 includes a guide roller 74 such as a roller guided by a guide rail 73 extending in the second direction A. The cap portion 60 is guided by the guide rail 73 to reciprocate in the second direction A. The cap portion 60 performs cleaning in a state where the nozzle surfaces 20N of the ejecting unit 20H are capped by the caps 64.

As illustrated in FIG. 6, the motion unit 30 includes the second moving mechanism 70 configured to move the cap portion 60 in the second direction A along the nozzle surfaces 20N. The second direction A is a direction intersecting (for example, orthogonal to) the movement direction B, which is the movement direction of the recording unit 20. The second moving mechanism 70 is, for example, a rack-and-pinion mechanism. In this case, the second moving mechanism 70 includes a rack 71 and a pinion 72 (driving gear), and a first slide motor 75, which is a driving source of the pinion 72. The second moving mechanism 70 moves the cap portion 60 in the second direction A in which the rack 71 extends. The length of the rack 71 is longer than the length of one turn of the pinion 72. The cap portion 60 can reciprocate in the second direction A by the second moving mechanism 70. In addition, a tube 68 coupled to a pump (not illustrated) assembled to the main body frame 33 of the motion unit 30 extends along the A direction, and the other end portion extending via an arc-shaped folded portion is coupled to the cap portion 60.

The cleaning unit 80 illustrated in FIG. 6 can reciprocate in the first direction X. The cleaning unit 80 is driven by the third moving mechanism 83 including a primary shaft 35A and a secondary shaft 35B illustrated in FIG. 8 by power of a second slide motor 88 illustrated in FIG. 8 as an example of the driving unit.

The movement direction B of the recording unit 20 is a direction including a vertical direction Z component. The cleaning unit 80 moves in the horizontal direction as the first direction X. The second direction A in which the cap portion 60 moves is a direction including a vertical direction Z component. The recording device 11 according to the present embodiment employs a three-axis motion layout in which the recording unit 20, the cap portion 60, and the cleaning unit 80 are movable in three axis directions intersecting each other. A movement region MA0 (see FIG. 5) of the recording unit 20 and a second movement region MA2 (see FIGS. 4 and 7) of the cleaning unit 80 at least partially overlap each other in the A direction. The movement region MA0 of the recording unit 20 and a first movement region MA1 (see FIGS. 4 and 7) of the cap portion 60 at least partially overlap each other in the X direction. Thus, the recording device 11 is miniaturized in both the A direction and the X direction.

Note that the first movement region MA1 of the cap portion 60 is a three-dimensional region in which the first movement region MA1 indicated by the AX plane in FIG. 4 is a bottom surface and the first movement region MA1 indicated by the B direction in FIG. 7 is a height. The second movement region MA2 of the cleaning unit 80 is also a three-dimensional region in which the second movement region MA2 indicated by the AX plane in FIG. 5 is a bottom surface and the second movement region MA2 indicated by the B direction in FIG. 7 is a height.

Configurations and Operations of Recording Unit 20, Cap Portion 60, and Cleaning Unit 80

Next, configurations and operations of the recording unit 20, the cap portion 60, and the cleaning unit 80 will be described in detail with reference to FIGS. 7 and 8 and the like.

In FIG. 7, the recording unit 20 is at the to-be-cleaned position PH2, the cap portion 60 is at the retraction position PC1 or the cap position PC2, and the cleaning unit 80 is at the retraction position PW1.

As illustrated in FIG. 7, the recording unit 20 is retracted to the to-be-cleaned position PH2 in the B direction. The cap portion 60 moves from the retraction position PC1 to the cap position PC2 in the A direction. At the cap position PC2, the recording unit 20 and the cap portion 60 face each other in the B direction. Next, when the recording unit 20 moves to the retraction position PH3 in the +B direction, the recording unit 20 is capped by the cap portion 60. In detail, the plurality of ejecting units 20H are covered with the plurality of caps 64. When recording is not performed, the recording unit 20 is on standby in a state where the ejecting units 20H are capped by the caps 64. The ejecting units 20H are cleaned in a state in which the ejecting units 20H are capped by the caps 64. The cleaning will be described in detail below.

When the recording unit 20 moves to the to-be-cleaned position PH2 slightly higher than the retraction position PH3, the unit heads 20U are separated from the caps 64. Next, the cap portion 60 moves in the −A direction and thus the cap portion 60 retracts outward of the movement region MA0 of the recording unit 20.

The cleaning unit 80 moves in the width direction X from the retraction position PW1 illustrated in FIG. 7 in a state in which the recording unit 20 is at the to-be-cleaned position PH2, and thus the nozzle surfaces 20N of the plurality of unit heads 20U are wiped by the wiper 81.

As illustrated in FIG. 7, the cap portion 60 and the cleaning unit 80 are located to overlap each other in the B direction. At least a part of the first movement region MA1 (see also FIG. 4) in which the cap portion 60 moves and at least a part of the second movement region MA2 (see also FIG. 5) in which the cleaning unit 80 moves are disposed at positions overlapping each other in the movement direction B.

In FIG. 7, the movement direction (A direction) of the cap portion 60 is a direction orthogonal to the paper, and the movement direction (X direction) of the cleaning unit 80 is the horizontal direction. Thus, in FIG. 7, the first movement region MA1 of the cap portion 60 and the second movement region MA2 of the cleaning unit 80 overlap each other in the B direction in an overlapping region LA. Thus, the recording device 11 can be miniaturized in the B direction. Since the cap portion 60 and the cleaning unit 80 are in a positional relationship of moving together on the common AX plane, the recording device 11 can be easily miniaturized in the B direction.

The recording device 11 further includes a restriction portion 65 configured to restrict the movement of the cleaning unit 80. The restriction portion 65 restricts entering of the cleaning unit 80 that should be positioned in the non-cleaning region NWA (see FIG. 5) into the movement region MA0 of the recording unit 20. By disposing a rib 65R at the side portion of the cap portion 60 in the overlapping region LA, the restriction portion 65 can be constituted by the rib 65R.

Note that as illustrated in FIG. 7, a plurality of tubes 67 communicating with the plurality of caps 64 are coupled to the cap carriage 66. When negative pressures are introduced into the caps 64 through the tubes 67, ink or the like is discharged as waste liquids from the nozzles of the unit heads 20U into the caps 64. The waste liquids discharged to the caps 64 are collected in a waste liquid accommodation unit (not illustrated) via the tubes 67.

Figure 8:
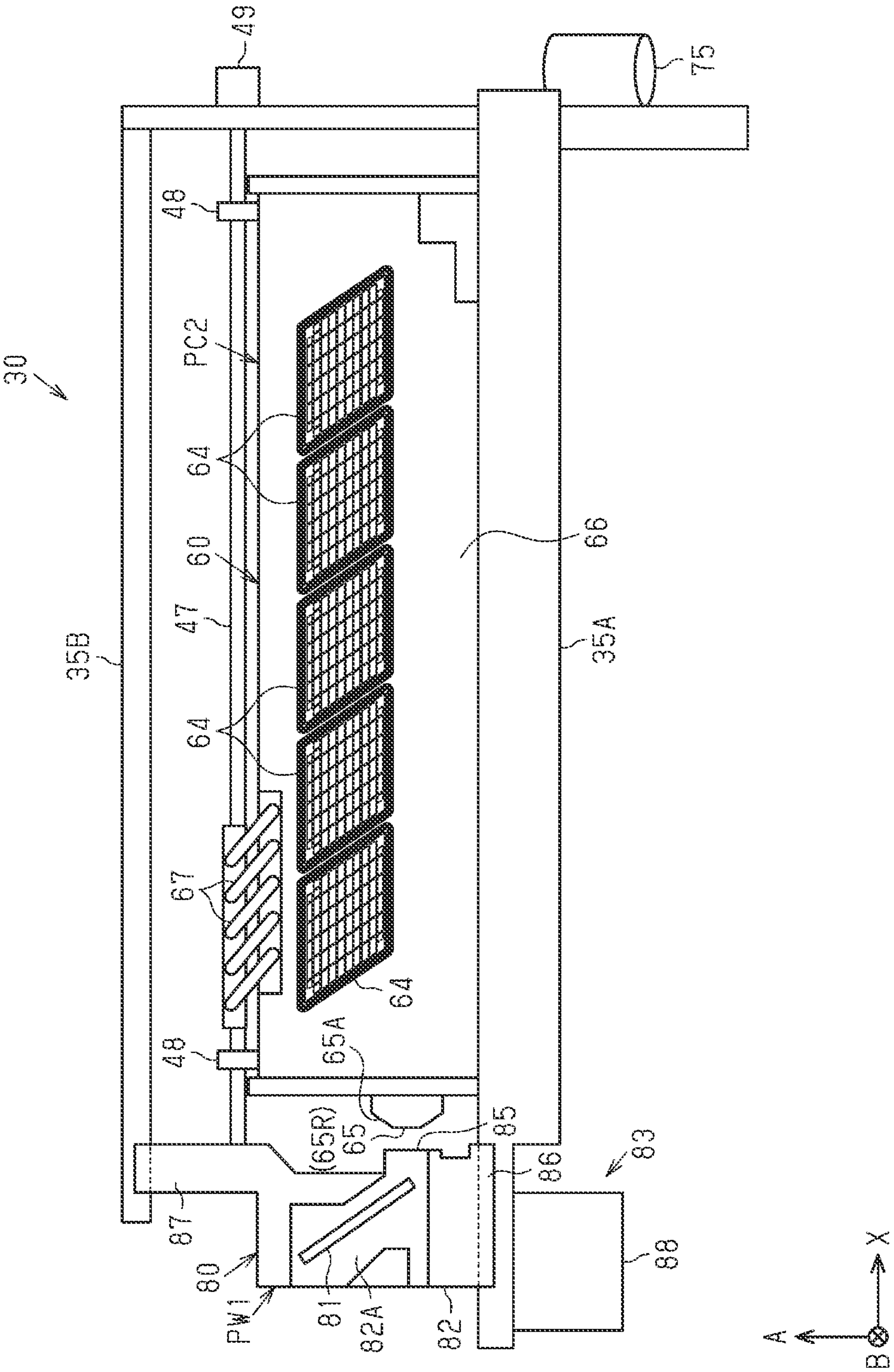
FIG. 8 is a view illustrating the cap portion and the cleaning unit as viewed from the B direction.

As illustrated in FIG. 8, the first slide motor 75, which is a driving source of the cap portion 60, is attached to a side portion of one of the side frames 34 (+X direction side). The cap portion 60 moves in the A direction by power of the first slide motor 75. The cap portion 60 moves in the +A direction when the first slide motor 75 rotates in a forward direction and moves in the −A direction when the first slide motor 75 rotates in a reverse direction. The second moving mechanism 70 for moving the cap portion 60 in a sliding manner in the A direction by power of the first slide motor 75 is a rack-and-pinion mechanism, but may be a belt-type power transmission mechanism.

When the cap portion 60 is at the cap position PC2 (see FIG. 4), a force for moving the cap portion 60 in the −A direction acts on the cap portion 60 due to its own weight (gravity). That is, a force for moving the cap portion 60 to the retraction position PC1 acts on the cap portion 60 at the cap position PC2 due to the gravity. For this reason, the cap portion 60 is designed to immediately return to the retraction position PC1 by the gravity even when the cap portion 60 at the retraction position PC1 (see FIG. 6) is accidentally touched by an operator during a maintenance operation and moves in the +A direction.

Regarding Cleaning Unit 80 and Third Moving Mechanism 83

As illustrated in FIG. 8, the motion unit 30 includes the primary shaft 35A and the secondary shaft 35B as guide members configured to guide the cleaning unit 80 in the width direction X. The primary shaft 35A and the secondary shaft 35B are disposed at a predetermined interval in the A direction and extend in the width direction X in parallel with each other. The second slide motor 88, which is a driving source of the cleaning unit 80, is attached to one end portion (end portion on the −X direction side) of the primary shaft 35A. In other words, the guide member to which the second slide motor 88 is attached serves as the primary shaft 35A.

In the cleaning unit 80, a first engaging portion 86 provided at a first end portion of the wiper carriage 82 is engaged with the primary shaft 35A, and a second engaging portion 87 provided at a second end portion thereof is engaged with the secondary shaft 35B. The wiper carriage 82 may move by sliding along the primary shaft 35A and the secondary shaft 35B, or the wiper carriage 82 may move along the primary shaft 35A and the secondary shaft 35B via a roller (not illustrated). The third moving mechanism 83 for moving the cleaning unit 80 in a sliding manner in the width direction X by power of the second slide motor 88 may be a belt-type power transmission mechanism or a rack-and-pinion mechanism. Note that the wiper 81 is assembled to the wiper carriage 82 in a state of being held by a holder 82A.

Regarding Mechanism of Restricting Movement of Cleaning Unit 80

As illustrated in FIG. 8, when the cleaning unit 80 does not perform cleaning, the restriction portion 65 restricts movement of the cleaning unit 80 located in the non-cleaning region NWA to the cleaning region WA. The restriction portion 65 according to the present embodiment is provided at the cap portion 60. The restriction portion 65 restricts movement of the cleaning unit 80 when the cap portion 60 is located at the cap position PC2 where the cap portion 60 covers the ejecting unit 20H.

In detail, the cap carriage 66 is provided with the restriction portion 65 in a protruding manner at a position facing an end portion of the cleaning unit 80 (end portion on the −X direction side) in the X direction when the cleaning unit 80 is at the retraction position PW1. The portion of the cleaning unit 80 facing the restriction portion 65 in the width direction X is a to-be-restricted portion 85.

An operator such as a user or a serviceperson may accidentally touch and move the cleaning unit 80 during maintenance. In addition, the cleaning unit 80 may move due to a vibration or the like of the recording device 11. In a case where the cleaning unit 80 enters the movement region MA0 of the recording unit 20, when the recording unit 20 moves in the +B direction in this state, the recording unit 20 collides with the cleaning unit 80. In this case, since the recording unit 20 is long in the width direction X, when one end portion of the recording unit 20 in the width direction X collides with the cleaning unit 80, the posture of the recording unit 20 is inclined diagonally. This causes tooth jump in engagement between the pinion and the rack of the recording unit 20.

To avoid this, in the present embodiment, the restriction portion 65 restricts entering of the cleaning unit 80 into the movement region MA0 (see FIG. 5) of the recording unit 20.

In a case where the cap portion 60 is at the cap position PC2 and the recording unit 20 is capped, when the cleaning unit 80 attempts to move from the retraction position PW1 toward the movement region MA0 (in the +X direction) of the recording unit 20, the to-be-restricted portion 85 comes into contact with the restriction portion 65. For this reason, the cleaning unit 80 is restricted so as not to move further toward the movement region MA0 of the recording unit 20. This mechanism of restricting the cleaning unit 80 will be described later.

Next, a detailed configuration of the mechanism of restricting movement of the cleaning unit 80 will be described with reference to FIGS. 9 and 10.

Figure 9:
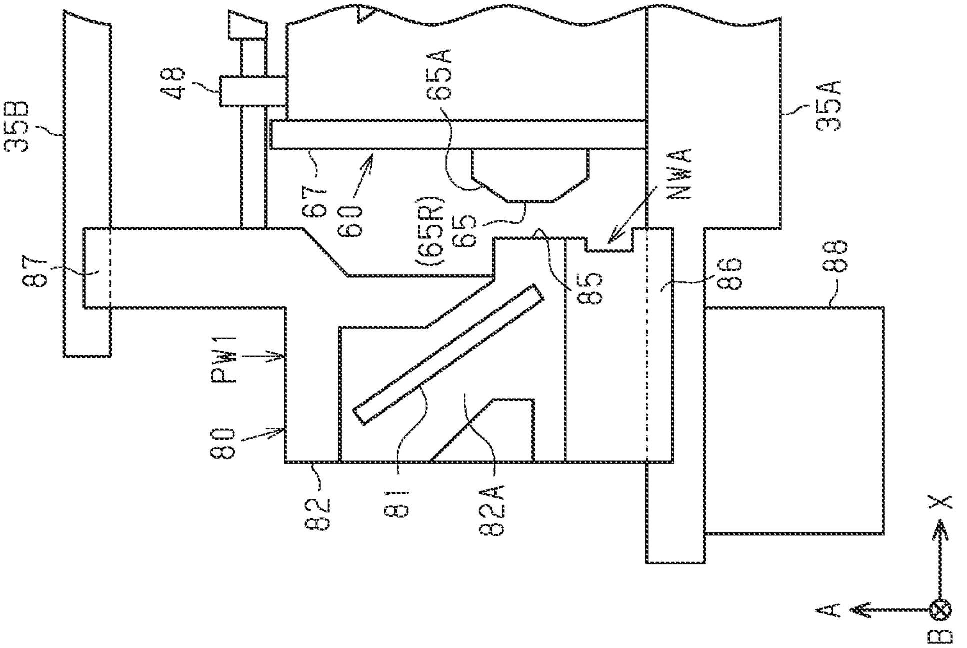
FIG. 9 is a schematic view of a state in which the cleaning unit is located at a retraction position as viewed from the B direction.

FIG. 9 illustrates a state in which the cleaning unit 80 is located at the retraction position PW1. FIG. 10 illustrates a state in which the cleaning unit 80 located at the retraction position PW1 is accidentally touched and moved by an operator during a maintenance operation or the cleaning unit 80 is moved due to a vibration of the recording device 11.

As illustrated in FIG. 9, the restriction portion 65 is the rib 65R that the cap portion 60 includes at a position facing the cleaning unit 80. The rib 65R is integrally provided to protrude from a side portion of the cap carriage 66 constituting the cap portion 60.

In addition, the rib 65R includes a guide surface 65A configured to prevent movement of the cap portion 60 from being blocked by contact between the rib 65R and the cleaning unit 80 when the cap portion 60 moves from the retraction position PC1 to the cap position PC2 facing the ejecting unit 20H. After the recording unit 20 is retracted to the retraction position PH3, the cleaning unit 80 slightly moves toward the cleaning region WA from the retraction position PW1, so that a part of the cleaning unit 80 may enter the movement region of the cap portion 60. In this case, when the rib 65R comes into contact with the cleaning unit 80 while the cap portion 60 moves to the cap position PC2, the cap portion 60 can move to the cap position PC2 while the cleaning unit 80 is guided toward the retraction position PW1 along the guide surface 65A. Note that in the example illustrated in FIG. 9, the guide surface 65A is an inclined surface. That is, in the example illustrated in FIG. 9, the guide surface 65A is constituted by an inclined surface inclined in such a direction that the guide surface is displaced in the +X direction as the guide surface extends in the +A direction.

The cap portion 60 includes the cap carriage 66 as an example of the first member made of resin. The rib 65R is formed integrally with the cap carriage 66. For this reason, it is not necessary to assemble the restriction portion 65 as a separate component, which can reduce the number of components and facilitate positioning of the rib 65R.

The cleaning unit 80 includes the wiper carriage 82 as an example of the second member made of resin. The rib 65R comes into contact with the wiper carriage 82, and thus movement in a direction toward the cleaning region WA is restricted. Due to the configuration in which the rib 65R made of resin and the wiper carriage 82, which is the resin portion of the cleaning unit 80, come into contact with each other, the resins come into contact with each other and slide along each other, which can eliminate, for example, lubricant such as lubricating oil.

The recording device 11 includes the second slide motor 88 configured to drive the cleaning unit 80, the primary shaft 35A configured to guide the cleaning unit 80, and the secondary shaft 35B configured to guide the cleaning unit 80 at the side opposite to the primary shaft 35A. Of the primary shaft 35A and the secondary shaft 35B, the second slide motor 88 is provided at the primary shaft 35A. In other words, of the two guide shafts configured to guide the cleaning unit 80, one provided with the second slide motor 88 is the primary shaft 35A, and the other is the secondary shaft 35B. The restriction portion 65 is located closer to the primary shaft 35A than to the secondary shaft 35B in the A direction. In other words, the restriction position at which the cleaning unit 80 comes into contact with the restriction portion 65 is closer to the primary shaft 35A than to the secondary shaft 35B.

Thus, the displacement of the cleaning unit 80 when the to-be-restricted portion 85 of the cleaning unit 80 comes into contact with the restriction portion 65 is suppressed to be small. That is, the cleaning unit 80 can receive a force from the restriction portion 65 at a position where the posture of the cleaning unit 80 is not easily lost by the force received from the restriction portion 65 when the cleaning unit 80 comes into contact with the restriction portion 65. For example, when the cleaning unit 80 comes into contact with the restriction portion 65 at a position closer to the secondary shaft 35B than to the primary shaft 35A, the posture of the cleaning unit 80 is easily lost by a force received at the time of contact.

Figure 10:
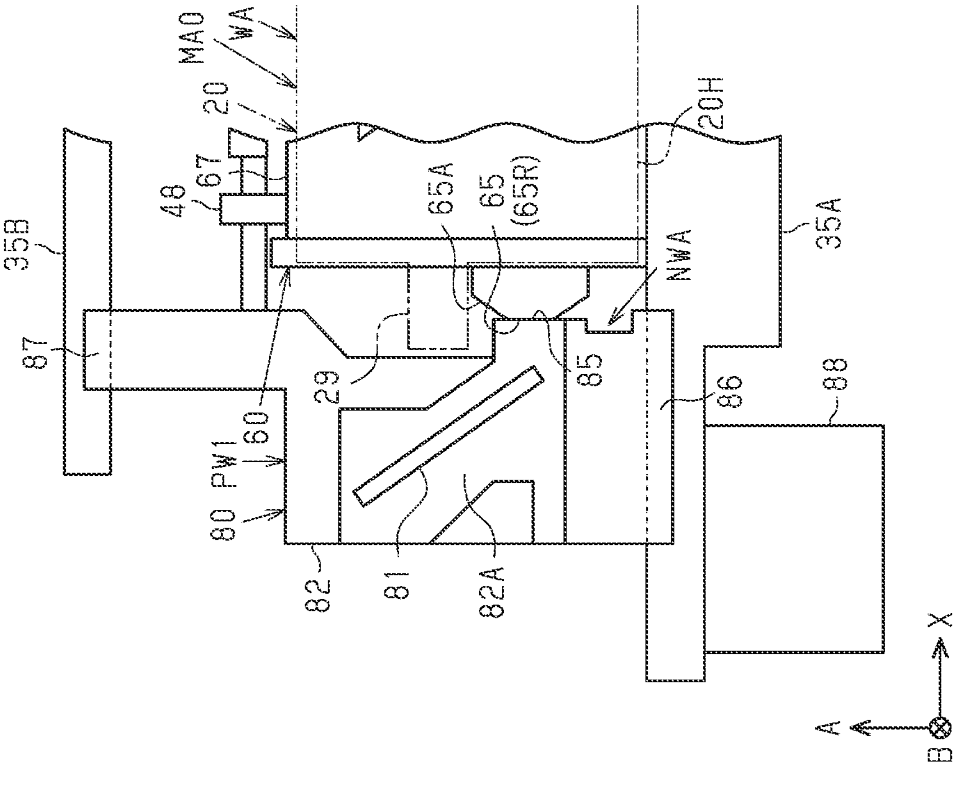
FIG. 10 is a schematic view of a state in which movement of the cleaning unit is restricted as viewed from the B direction.

As illustrated in FIG. 10, even when the recording unit 20 moves in the B direction in a state in which the restriction portion 65 and the to-be-restricted portion 85 are in contact with each other, the cleaning unit 80 is located outside the movement region MA0 of the recording unit 20 indicated by a chain double-dashed line in FIG. 10. As illustrated in FIG. 10, the roller 29 of the recording unit 20 protrudes further in the −X direction than the restriction portion 65. However, a portion corresponding to the roller 29 of the recording unit 20 is a recessed portion more recessed in the −X direction than the to-be-restricted portion 85 of the wiper carriage 82. Thus, the roller 29 is located in the recessed portion, so that the position of the cleaning unit 80 is restricted to the outside of the movement region MA0 of the recording unit 20.

In the present embodiment, in a standby state in which the recording unit 20 is on standby in a capping state when recording is not performed, an abnormal state is avoided in which the cleaning unit 80 moves to the movement region MA0 of the recording unit 20. When the recording unit 20 is in the capping state in the standby state, an abnormal state may occur in which the cap portion 60 moves from the cap position PC2 where the cap portion 60 covers the ejecting unit 20H. In this case, since the ejecting unit 20H and the caps 64 are in close contact with each other in the capping state, the ejecting unit 20H may be damaged when the cap portion 60 moves forcibly.

Thus, in the present embodiment, the plurality of caps 64 are held in a floating state so as to be capable of being displaced in a direction parallel to the AX plane with respect to the cap carriage 66. Thus, even if the cap portion 60 moves in the capping state, the ejecting unit 20H can be protected. That is, while the caps 64 are pressed against the ejecting unit 20H and thus attempt to stay at that position, the cap carriage 66 is movable without receiving a pressing force. When the cap carriage 66 moves slightly, the caps 64 can maintain the state of capping the ejecting unit 20H. When the recording device 11 vibrates or the operator lightly touches the cap carriage 66, the cap carriage 66 may return to its original position by receiving an elastic reaction force from an elastic member having a floating structure of the caps 64. If the cap portion 60 malfunctions or the operator greatly moves the cap portion 60, the plurality of caps 64 fall off the cap carriage 66 together with the floating cap unit. Accordingly, since it is avoided that a large load from the cap carriage 66 is applied to the ejecting unit 20H, the ejecting unit 20H is protected. Note that the cap unit including the plurality of caps 64 and the cap carriage 66 are coupled to each other via a string-like flexible member. Even if the cap unit falls off the cap carriage 66, the cap unit can be easily found.

In FIG. 6, the cap portion 60 is configured to be removed in a removal direction intersecting the guide rail 73 configured to guide movement in the second direction A. The restriction portion 65 is located at a side in the removal direction with respect to the guide rail 73 in a state where the cap portion 60 is attached to the guide rail 73. In FIG. 6, when the cap portion 60 is replaced, the cap portion 60 moves to the replacement position PC3 located at an end portion opposite to the retraction position PC1. At the replacement position PC3, the cap portion 60 is rotated counterclockwise in FIG. 5 and thus removed from the guide rail 73. At this time, the restriction portion 65 of the cap portion 60 is located at a side in the removal direction with respect to the guide rail 73 in a state where the cap portion 60 is mounted at the guide rail 73. Thus, when the cleaning unit 80 is removed from the guide rail 73, the cleaning unit 80 can be easily removed without the restriction portion 65 interfering with the guide rail 73.

Electrical Configuration of Recording Device 11

Figure 11:
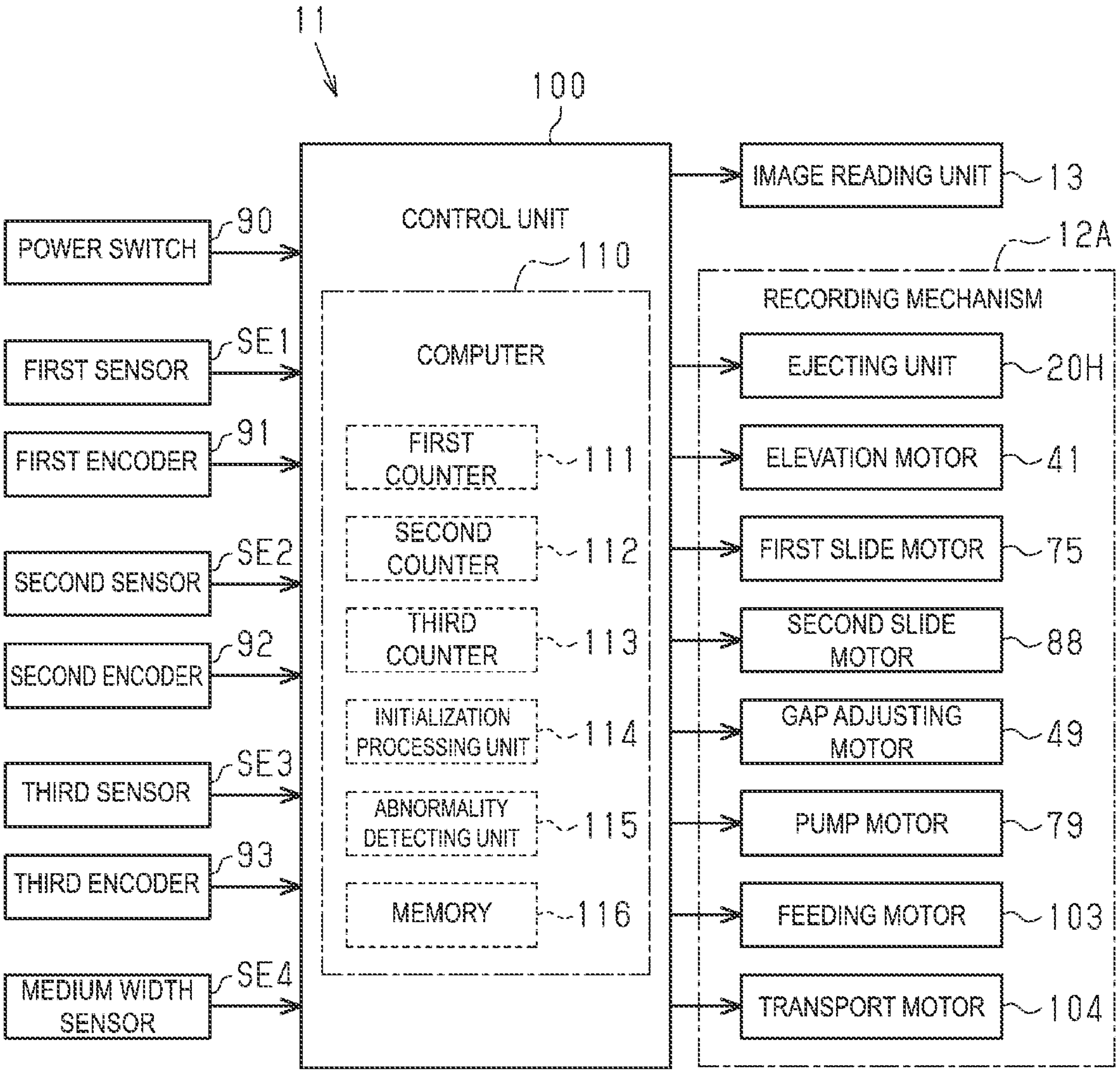
FIG. 11 is a block diagram illustrating an electrical configuration of the recording device.

Next, an electrical configuration of the recording device 11 will be described with reference to FIG. 11. The recording device 11 receives recording data from, for example, a host device (not illustrated). The recording data includes recording condition information and image data. The control unit 100 is electrically coupled to components of the image reading unit 13 and a recording mechanism 12A. The electrical components of the recording mechanism 12A are the ejecting unit 20H, the elevation motor 41, the first slide motor 75, the second slide motor 88, a gap adjusting motor 49, a pump motor 79, a feeding motor 103, a transport motor 104, and the like. The control unit 100 controls these electrical components to cause the recording mechanism 12A to perform a recording operation.

The control unit 100 performs recording control of ejecting a liquid such as ink from the nozzles by controlling the ejecting unit 20H. The control unit 100 performs movement control of moving the recording unit 20 in the movement direction B by controlling the elevation motor 41. The control unit 100 perform movement control of moving the cap portion 60 in the second direction A by controlling the first slide motor 75. The control unit 100 performs movement control of moving the cleaning unit 80 in the first direction X by controlling the second slide motor 88.

Further, the control unit 100 adjusts the recording position PH4 of the ejecting unit 20H by controlling the gap adjusting motor 49, which is a driving source of the eccentric cam 48. This adjustment adjusts the gap between the medium M and the nozzle surfaces 20N according to the type of the medium M.

In addition, the control unit 100 performs cleaning of forcibly discharging a liquid such as ink from the nozzles of the ejecting unit 20H by controlling the pump motor 79. Note that the cleaning may be decompression cleaning of making the pressure in the caps 64 negative to forcibly discharge the liquid such as ink from the nozzles, or may be pressurization cleaning of pressurizing the liquid accommodation unit 101 to forcibly discharge the liquid such as ink from the nozzles.

The control unit 100 rotates the pickup rollers 22 (see FIG. 2) by controlling the feeding motor 103 to feed the medium M accommodated in the cassettes 15 one by one. In addition, the control unit 100 perform transport control of controlling the transport motor 104 to drive the transport roller pairs 23, 24, and 26 and the transport belt 25B (see FIG. 2) thereby transporting the medium M along the transport path T.

The first sensor SE1, the second sensor SE2, the third sensor SE3, and the medium width sensor SE4 are electrically coupled to the control unit 100. A first encoder 91, a second encoder 92, and a third encoder 93 are electrically coupled to the control unit 100.

The control unit 100 includes a computer 110. The computer 110 includes a first counter 111, a second counter 112, a third counter 113, an initialization processing unit 114, an abnormality detecting unit 115, and a memory 116.

The computer 110 of the control unit 100 includes a central processing unit (CPU), a read only memory (ROM), a random access memory (RAM), and a storage (not illustrated). The control unit 100 controls transport of the medium M in the recording device 11 and an operation in which the recording unit 20 performs recording on the medium M. In detail, the control unit 100 is not limited to one executing software processing for all the processing operations to be executed by the control unit 100 itself. For example, the control unit 100 may include a dedicated hardware circuit (for example, an application-specific integrated circuit (ASIC)) executing hardware processing for at least part of the processing to be executed by the control unit 100 itself. That is, the control unit 100 may be configured as circuitry including one or more processors operating according to a computer program (software), one or more dedicated hardware circuits executing at least some of various processing operations, or a combination thereof. The processor includes a CPU and the memory 116 such as a RAM and a ROM, and the memory 116 stores a program code or an instruction configured to cause the CPU to perform processing. The memory 116, that is, a computer-readable medium, includes any available medium that can be accessed by the general purpose or special purpose computer 110.

The first counter 111 counts a value indicating the position of the recording unit 20 on the movement path with the replacement position PH1 as the origin point, for example. The first counter 111 counts the number of pulse edges of a detection signal input from the first encoder 91. In the origin setting operation of the recording unit 20, when the first sensor SE1 detects the recording unit 20 that has reached the replacement position PH1, the first counter 111 is reset.

The second counter 112 counts a value indicating the position of the cap portion 60 on the movement path with the retraction position PC1 as the origin point. The second counter 112 counts the number of pulse edges of a detection signal input from the second encoder 92. In the origin setting operation of the cap portion 60, when the second sensor SE2 detects the cap portion 60 that has reached the retraction position PC1, the second counter 112 is reset.

The third counter 113 counts a value indicating the position of the cleaning unit 80 on the movement path with the retraction position PW1 as the origin point. The third counter 113 counts the number of pulse edges of a detection signal input from the third encoder 93. In the origin setting operation of the cleaning unit 80, when the third sensor SE3 detects the cleaning unit 80 that has reached the retraction position PW1, the third counter 113 is reset.

The initialization processing unit 114 performs a position detection operation of detecting the position of the cleaning unit 80 when an abnormality is detected, and does not perform the position detection operation of the cleaning unit 80 when the power is switched from OFF to ON. In detail, the initialization processing unit 114 executes the initialization processing when the abnormality detecting unit 115 detects an abnormality. The initialization processing includes the origin setting operation of the cleaning unit 80 as the position detection operation of the cleaning unit 80. The initialization processing may also include the origin setting operation of the recording unit 20 and the origin setting operation of the cap portion 60. In the origin setting operation, when a target of the origin setting is moved to the origin position and the sensor enters a detection state, the corresponding counter is reset. Alternatively, the origin setting may be performed by pressing the target of the origin setting against a stopper member located at one end side on the movement path.

In a case where the origin setting operation of the cleaning unit 80 is taken as an example, when the cleaning unit 80 is moved to a position where the third sensor SE3 detects the cleaning unit 80 and the third sensor SE3 enters a detection state, the corresponding third counter 113 is reset. Alternatively, the origin position setting may be performed by pressing the cleaning unit 80 against a stopper member located at one end side of the movement path. In the initialization processing, as processing other than the origin setting operation, processing of detecting a motor load under a state where the medium M is not present may be performed. The detected motor load is used for determination of a threshold used for abnormality detection.

The abnormality detecting unit 115 detects an abnormality of the recording device 11. The control unit 100 stores, in the memory 116, appropriate positions at which the recording unit 20, the cap portion 60, and the cleaning unit 80 should be located at each operation timing. The abnormality detecting unit 115 acquires the current position of the detection target based on the count value of the counter corresponding to the detection target. When the detection target is out of a range of the appropriate position at each operation timing, the abnormality detecting unit 115 detects that the position of the detection target is abnormal.

The abnormality detecting unit 115 may perform abnormality detection of the cleaning unit 80 as follows at a timing before the recording unit 20 starts moving to the recording position PH4. The abnormality detecting unit 115 acquires the current position of the cleaning unit 80 based on the count value of the third counter 113. When the current position of the cleaning unit 80 is within the movement region of the recording unit 20, the abnormality detecting unit 115 detects that the position of the cleaning unit 80 is abnormal. Note that in the present embodiment, in a case where it is certain that the cleaning unit 80 is outside the movement region of the recording unit 20 due to the presence of the restriction portion 65, abnormality detection by the abnormality detecting unit 115 may be omitted.

When the abnormality detecting unit 115 detects an abnormality, the control unit 100 causes the initialization processing unit 114 to perform at least the origin setting operation.

The abnormality detecting unit 115 also detects a medium jam. The abnormality detecting unit 115 monitors the loads of the feeding motor 103 and the transport motor 104 during transport, and detects a jam of the medium M when a load of any one of the motors 103 and 104 exceeds a predetermined threshold. When the abnormality detecting unit 115 detects an abnormality, the control unit 100 determine an error and performs error processing of bringing the recording device 11 to an emergency stop. Note that the control unit 100 also detects various abnormalities other than the positional abnormality of the detection target and the medium jam, and brings the recording device 11 to an emergency stop when an abnormality is detected.

Actions of Embodiment

Next, actions of the recording device 11 will be described.

The user instructs the recording device 11 to perform printing by operating the operation unit 14 of the recording device 11. The recording device 11 transports the medium M and performs recording on the medium M based on a print job input from the host device. The control unit 100 controls the transport unit 21 according to a print command included in the print job and controls the recording unit 20 based on image data. In this way, the recording device 11 performs recording on the medium M.

When the abnormality detecting unit 115 detects an abnormality such as a medium jam, the control unit 100 brings the recording device 11 to an emergency stop. When the abnormality such as the medium jam is solved, the user operates the operation unit 14 to notify the recording device 11 that the abnormality has been solved. The recording device 11 recovered from the emergency stop state performs the initialization processing. In the initialization processing, the origin setting operation of each of the recording unit 20, the cap portion 60, and the cleaning unit 80 is performed.

At the origin position of each of the recording unit 20, the cap portion 60, and the cleaning unit 80, the corresponding counter is reset. That is, when the recording unit 20 reaches the origin position, the first counter 111 counting the position of the recording unit 20 is reset. When the cap portion 60 reaches the origin position, the second counter 112 counting the position of the cap portion 60 is reset. When the cleaning unit 80 reaches the origin position, the third counter 113 counting the position of the cleaning unit 80 is reset.

Thereafter, the control unit 100 acquires the position of the recording unit 20 based on the count value of the corresponding first counter 111. The control unit 100 acquires the position of the cap portion 60 based on the count value of the corresponding second counter 112. The control unit 100 acquires the position of the cleaning unit 80 based on the count value of the corresponding third counter 113. The count values of the counters 111, 112, and 113 after the origin setting indicate the correct positions of the recording unit 20, the cap portion 60, and the cleaning unit 80, respectively.

For example, when performing a maintenance operation of the recording device 11, the operator turns off power by operating the power switch 90. Even when the operator accidentally touches the cleaning unit 80 during the maintenance and moves the cleaning unit 80, the to-be-restricted portion 85 comes into contact with the restriction portion 65, which restricts further movement of the cleaning unit 80 toward the cleaning region WA. This prevents even a part of the cleaning unit 80 from entering the movement region MA0 of the recording unit 20.

After the maintenance operation is completed, the operator turns on the recording device 11 by operating the power switch 90. The control unit 100 does not perform the initialization processing at power-on. Thus, when receiving a print job immediately after the power-on, the control unit 100 can immediately start a recording operation based on the print job.

Figure 12:
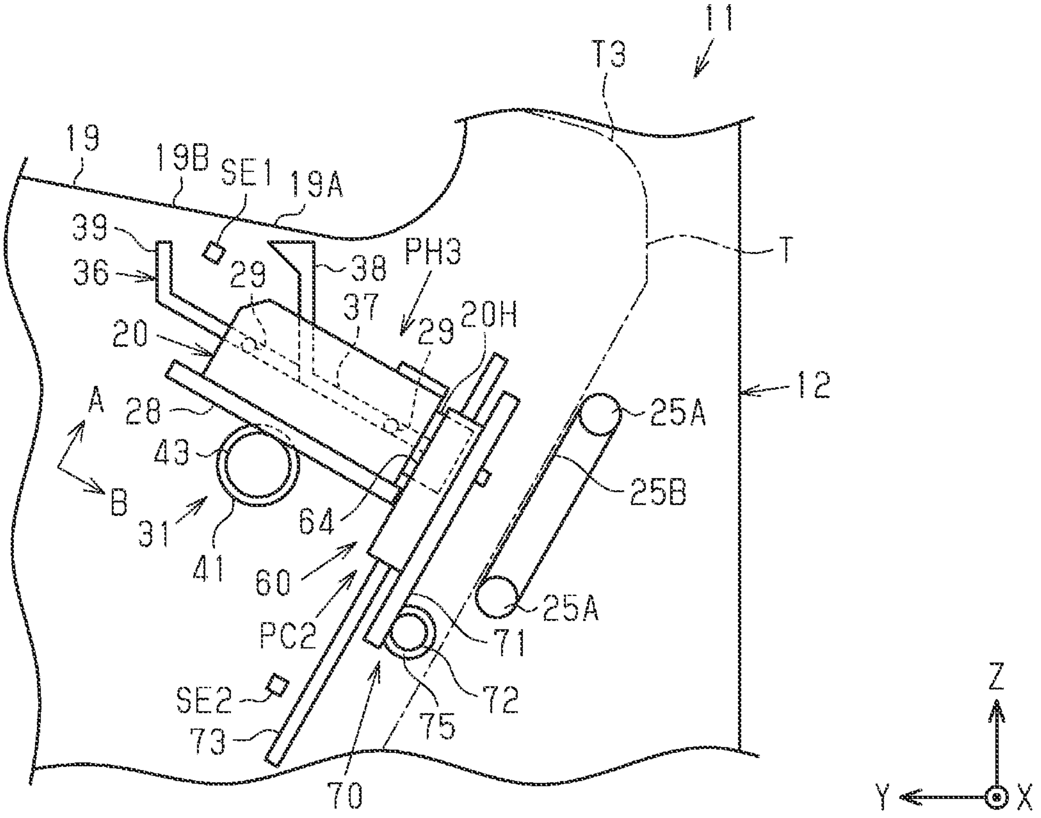
FIG. 12 is a schematic front view illustrating a capping state.

At the power-on, the recording unit 20 is at the retraction position PH3, and the cap portion 60 is at the cap position PC2, as illustrated in FIG. 12. The ejecting unit 20H is in a capping state in which the ejecting unit 20H is covered with the caps 64.

Figure 13:
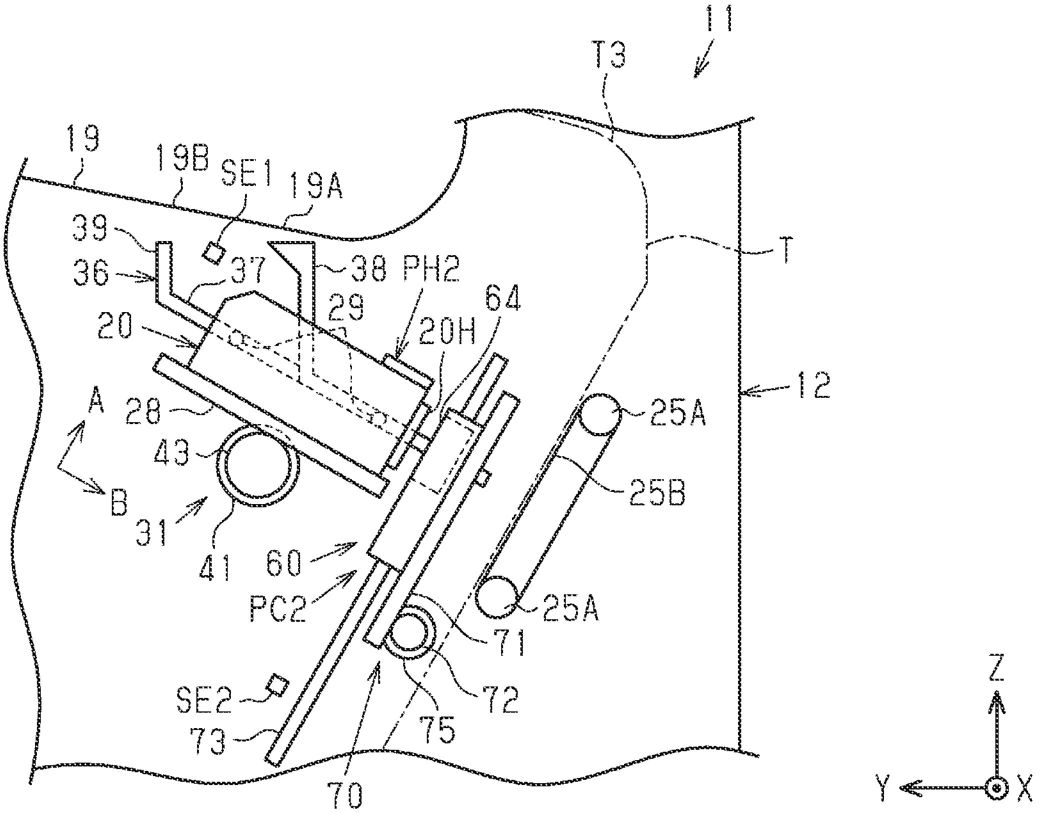
FIG. 13 is a schematic front view illustrating a state in which the recording unit is retracted from the capping state.
Figure 14:
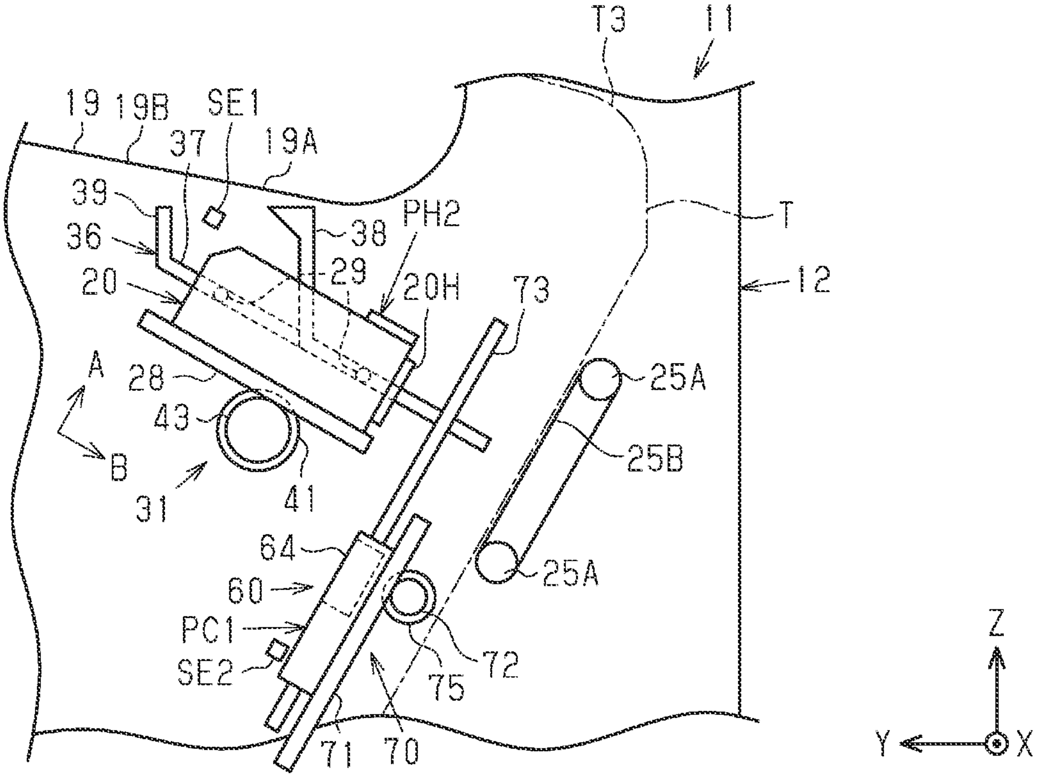
FIG. 14 is a schematic front view illustrating a state in which the cap portion is retracted to the retraction position.

As illustrated in FIG. 13, the recording unit 20 moves from the retraction position PH3 to the to-be-cleaned position PH2. Next, as illustrated in FIG. 14, the cap portion 60 moves from the cap position PC2 to the retraction position PC1.

Figure 15:
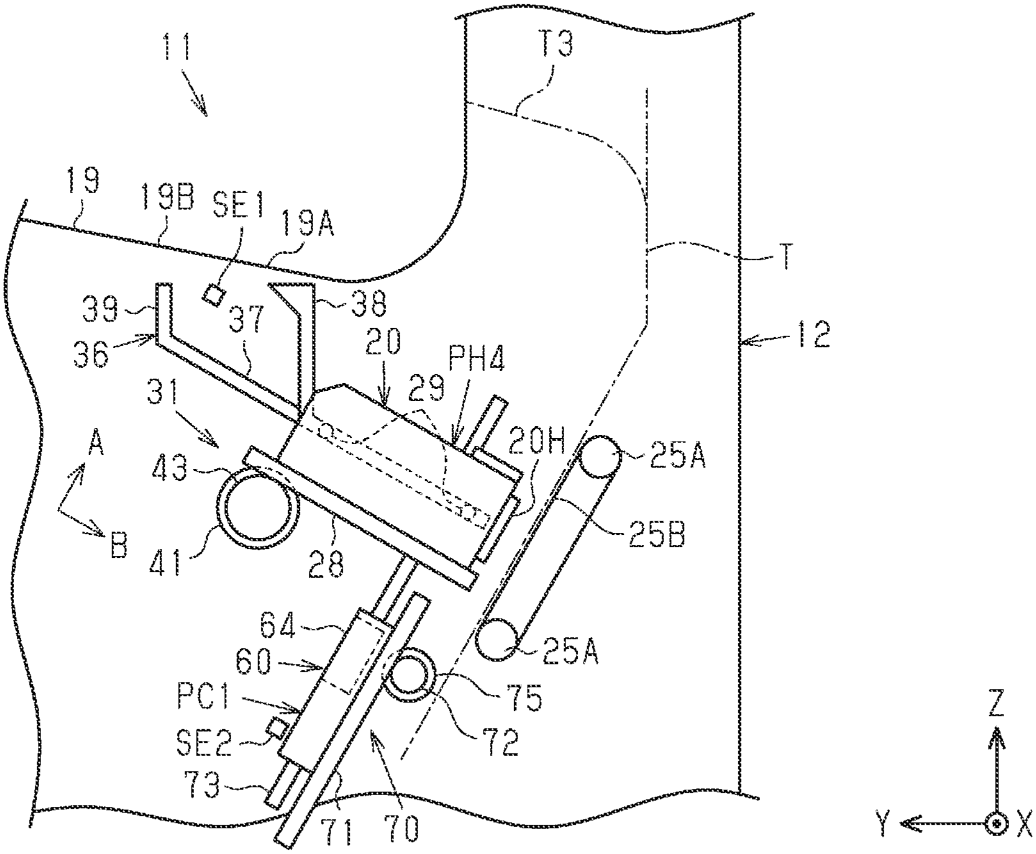
FIG. 15 is a schematic front view illustrating a state in which the recording unit is moved to a recording position.

Next, as illustrated in FIG. 15, the recording unit 20 moves from the to-be-cleaned position PH2 to the recording position PH4. At this time, the cleaning unit 80 is at the retraction position PW1 as illustrated in FIG. 9, or the to-be-restricted portion 85 is in contact with the restriction portion 65 as illustrated in FIG. 10. In any case, the cleaning unit 80 is located in the non-cleaning region NWA. Thus, the recording unit 20 does not collide with the cleaning unit 80 in the course in which the recording unit 20 moves from the to-be-cleaned position PH2 to the recording position PH4.

The recording unit 20 at the recording position PH4 performs recording on the medium M by ejecting a liquid toward the medium M being transported.

For example, after the recording is completed, the recording unit 20 moves to the to-be-cleaned position PH2. Next, the cap portion 60 moves from the retraction position PC1 to the cap position PC2. At this time, the cleaning unit 80 may slightly enter the cleaning region WA, the movement region of the recording unit 20, or the movement region of the cap portion 60. In this case, the rib 65R may collide with the cleaning unit 80 in the course in which the cap portion 60 moves from the retraction position PC1 to the cap position PC2. Even in such a case, the cleaning unit 80 is pushed toward the retraction position PW1 along the guide surface 65A of the rib 65R. As a result, the cap portion 60 can reliably move to the cap position PC2. This enables capping in which the caps 64 cover the ejecting unit 20H.

Effects of Embodiment

According to the embodiment, the following effects can be obtained.

(1) The recording device 11 includes the recording unit 20 configured to perform recording on the medium M by ejecting a liquid from the ejecting unit 20H, the transport belt 25B configured to support the medium M at a position facing the recording unit 20, and the first moving mechanism 31 configured to move at least one of the recording unit 20 or the transport belt 25B with respect to the other in the movement direction B. The recording device 11 further includes the cleaning unit 80 provided in a manner movable forward and backward with respect to a position between the recording unit 20 and the transport belt 25B in the first direction X intersecting the movement direction B, the cleaning unit 80 being configured to start moving from the non-cleaning region NWA and move in the cleaning region WA in the first direction X when the recording unit 20 is located at the to-be-cleaned position PH2, thereby cleaning the ejecting unit 20H. The recording device 11 includes the restriction portion 65 configured to restrict movement of the cleaning unit 80 located in the non-cleaning region NWA to the cleaning region WA when the cleaning unit 80 does not perform cleaning. According to this configuration, the restriction portion 65 can restrict entering of the cleaning unit 80 into the movement region MA0 of at least one of the recording unit 20 or the transport belt 25B. Thus, it is possible to avoid collision between at least one of the recording unit 20 or the transport belt 25B and the cleaning unit 80. Accordingly, it is possible to avoid a fault caused by contact between at least one of the recording unit 20 or the transport belt 25B and the cleaning unit 80.

(2) The recording device 11 includes the cap portion 60 provided in a manner movable forward and backward with respect to a position between the recording unit 20 and the transport belt 25B in the second direction A intersecting the movement direction B, the cap portion 60 being configured to cover the ejecting unit 20H when the recording unit 20 is located at the retraction position PH3. The restriction portion 65 is provided at the cap portion 60 and restricts movement of the cleaning unit 80 when the cap portion 60 is at the cap position PC2 where the cap portion 60 covers the ejecting unit 20H. This configuration makes it possible to prevent the cleaning unit 80 from entering the movement region MA0 (cleaning region WA) of the recording unit 20 when the cap portion 60 is disposed at a position facing the recording unit 20. Thus, the restriction portion 65 may have a simpler configuration than in a case where a dedicated restriction portion 65 is configured in a manner movable forward and backward.

(3) In the recording device 11, at least a part of the first movement region MA1 in which the cap portion 60 moves and at least a part of the second movement region MA2 in which the cleaning unit 80 moves are disposed at positions overlapping each other at least partially in the movement direction B. The restriction portion 65 is the rib 65R that the cap portion 60 includes at a position facing the cleaning unit 80. According to this configuration, the rib 65R provided at the cap portion 60 comes into contact with the cleaning unit 80, which thus can restrict movement of the cleaning unit 80. The arrangement of the rib 65R enables the device to be configured with the device size maintained in the movement direction B of the cleaning unit 80, and thus the device can be achieved with a typical device size. In addition, the initialization operation of initializing the position of the movable body including at least the cleaning unit 80 can be eliminated. This makes it possible to configure the recording device 11 without affecting the throughput of print start after power-on.

(4) The rib 65R includes the guide surface 65A configured to prevent movement of the cap portion 60 from being blocked by contact between the rib 65R and the cleaning unit 80 when the cap portion 60 moves from the retraction position PC1 to the cap position PC2 facing the ejecting unit 20H. This configuration makes it possible to suppress a case in which the cap portion 60 interferes with the cleaning unit 80 and the movement of the cap portion 60 is blocked when the cap portion 60 performs capping for covering the ejecting unit 20H.

(5) The cap portion 60 includes the cap carriage 66 as an example of the first member made of resin. The rib 65R is formed integrally with the cap carriage 66. According to this configuration, the restriction portion 65 can be configured without increase in the number of components. As a result, the number of assembly man-hours of the cleaning unit 80 does not increase, and a positional variation of the rib 65R is suppressed to be small. Components of the cleaning unit 80 can be also easily replaced during maintenance.

(6) The cleaning unit 80 includes the wiper carriage 82 as an example of the second member made of resin. The rib 65R restricts movement of the cleaning unit 80 to the cleaning region WA by coming into contact with the wiper carriage 82. According to this configuration, due to the configuration in which the rib 65R made of resin and the resin portion of the cleaning unit 80 come into contact with each other, the resins come into contact with each other and slide along each other, which thus can eliminate, for example, lubricating oil. Since the lubricating oil is not used, there is no possibility that the lubricating oil flows into the recording region to cause a printing failure. Necessary durability can be obtained without maintenance such as application of lubricant.

(7) The recording device 11 includes the second slide motor 88 as an example of the driving unit configured to drive the cleaning unit 80, the primary shaft 35A configured to guide the cleaning unit 80, and the secondary shaft 35B configured to guide the cleaning unit 80 on the side opposite to the primary shaft 35A. Of the primary shaft 35A and the secondary shaft 35B, the second slide motor 88 is provided at the side of the primary shaft 35A. The restriction position at which the cleaning unit 80 comes into contact with the restriction portion 65 is closer to the primary shaft 35A than to the secondary shaft 35B. According to this configuration, it is possible to suppress inclination of the posture of the cleaning unit 80 when the restriction portion 65 and the cleaning unit 80 collide with each other. Since the cleaning unit 80 can be held in a correct posture while movement of the cleaning unit 80 is restricted, the ejecting unit 20H can be appropriately cleaned.

(8) The cap portion 60 is configured to be removed in the removal direction intersecting the guide rail 73 configured to guide movement in the second direction A, and the restriction portion 65 is located at a side in the removal direction with respect to the guide rail 73 in a state in which the cap portion 60 is mounted at the guide rail 73. According to this configuration, the cap portion 60 can be easily attached to and detached from the guide rail 73 even when the restriction portion 65 is provided. That is, even when the restriction portion 65 is provided, the ease of attachment and detachment of the cap portion 60 is not impaired.

(9) The recording device 11 includes the abnormality detecting unit 115 configured to detect an abnormality. When the abnormality is detected, a position detection operation of detecting the position of the cleaning unit 80 is performed. When the power is switched from OFF to ON, the position detection operation of the cleaning unit 80 is not performed. According to this configuration, since the position detection operation of the cleaning unit 80 is performed when an abnormality occurs, the correct position of the cleaning unit 80 can be acquired. Since the position detection operation of the cleaning unit 80 is omitted when the power is switched from OFF to ON, it is possible to start recording on the medium M immediately after power-on, which thus can suppress deterioration of throughput.

(10) The movement direction B is a direction including a vertical direction Z component, and the cleaning unit 80 moves in the horizontal direction as the first direction X. According to this configuration, since the movement direction X of the cleaning unit 80 is the horizontal direction and includes no vertical direction Z component, the cleaning unit 80 does not return to the retraction position PW1 by its own weight once the cleaning unit 80 has moved due to a vibration or an operation error. Since movement of the cleaning unit 80 having such a configuration is restricted by the restriction portion 65, the cleaning unit 80 can avoid collision with at least one of the recording unit 20 or the transport belt 25B.

(11) The movement direction B is a direction including a vertical direction Z component, the cleaning unit 80 moves in the horizontal direction as the first direction X, and the second direction A in which the cap portion 60 moves is a direction including a vertical direction Z component. According to this configuration, since the cleaning unit 80 that has moved does not return to the retraction position PW1 by its own weight, a problem of collision may occur once the cleaning unit 80 has moved. Even in such a configuration, since movement of the cleaning unit 80 is restricted by the restriction portion 65, it is possible to prevent the cleaning unit 80 from colliding with at least one of the recording unit 20 or the transport belt 25B.

MODIFICATIONS

The present embodiment can be modified and implemented as follows. The present embodiment and the following modifications can be mutually combined and implemented within a technically consistent range.

- The cleaning unit 80 may be a cloth wiper instead of a blade. The cloth wiper includes, in a main body, a supply roll for winding an unused long cloth and a winding roll for winding a used cloth. In the middle of the path from the supply roll to the winding roll, the cloth passes over the outer circumferential surface of the roller. A part of the cloth passing over the outer circumferential surface of the roller is partially exposed upward from the main body, and the exposed portion of the cloth in the shape of an arc surface forms the cloth wiper.
- The support portion disposed at a position facing the recording unit 20 is not limited to the transport belt 25B and may be, for example, a platen. In addition, in the case of the transport belt 25B, the transport belt 25B may be of either an electrostatic type or a suction type.
- The support portion may be configured to move in the movement direction B. In this case, both the recording unit 20 and the support portion may be configured to move in the movement direction B, or only the support portion of the recording unit 20 and the support portion may be configured to move in the movement direction B. In the former case, the cleaning unit 80 can avoid collision with both the recording unit 20 and the support portion, and in the latter case, the cleaning unit 80 can avoid collision with the support portion.
- The guide surface 65A is not limited to, for example, a flat inclined surface and may be a curved surface.
  - The first member may be a member other than the cap carriage 66.
  - The second member may be a member other than the wiper carriage 82.
- The driving unit of the cleaning unit 80 may be constituted by only a motor or may include a driving gear.
  - The control unit 100 may perform the initialization processing at power-on.
- The "restriction portion" may be provided at or included in a member other than the cap portion 60. For example, the restriction portion may be provided at at least one member of the cleaning unit 80, the recording unit 20, or the support portion. For example, when the cleaning unit 80 includes the restriction portion, the restriction portion may have a predetermined shape such as an arm shape extending from the wiper carriage 82 of the cleaning unit 80 in a path avoiding the movement region MA0 of the recording unit 20. When the cleaning unit 80 is at the retraction position PW1, the restriction portion having the predetermined shape comes into contact with a predetermined portion of the cap portion 60 at the cap position PC2 or comes into contact with a predetermined portion of the recording unit 20 at the retraction position PH3, thereby restricting movement of the cleaning unit 80 into the movement region MA0. Note that the restriction portion may be integrally formed or may be attached as a separate member.
- When the restriction portion is a separate member, the restriction portion may be configured to move between a restriction position at which the restriction portion restricts movement of the cleaning unit 80 from the retraction position PW1 and a non-restriction position at which the restriction portion does not restrict movement of the cleaning unit 80 from the retraction position PW1. In this case, the restriction portion may be configured to move via a cam mechanism (not illustrated) as the cap portion 60 or the recording unit 20 moves, or may be configured to move by power of an actuator such as a motor controlled by the control unit 100.
- In the above-described embodiment, a three-axis motion layout is adopted in which the recording unit 20, the cap portion 60, and the cleaning unit 80 are movable in three axis directions intersecting each other. A two-axis motion layout may be adopted in which the recording unit 20 and the cleaning unit 80 are movable in two axis directions intersecting each other. That is, a configuration may be adopted in which the recording unit 20 and the cleaning unit 80 are movable and the cap portion 60 is immovable. For example, the cap portion 60 may be disposed at a position out of the recording region where recording is performed on the medium M. A configuration may be also adopted in which the recording unit 20 moves to a position facing the cap portion 60, so that capping in which the caps 64 cover the ejecting unit 20H is performed. In this case, the recording device 11 may be a line printer, but this configuration is applied particularly easily when the recording device 11 is a serial printer.
- The recording device 11 may be a textile printing device configured to perform printing on a medium by ejecting a liquid such as ink onto fabric, which is an example of the medium.

The recording device 11 may be an ink-jet printer including a feeding unit at which a roll around which a long medium M such as roll paper can be mounted.

The medium M may be paper, a plastic sheet or film, a metal sheet or film, a medium including paper and plastic, a laminate sheet including metal and plastic, or the like.

An ejection driving element incorporated for the ejecting unit 20H to eject a liquid such as ink from the nozzles may be of any driving type such as a piezoelectric type, an electrostatic type, or a bubble type.

The recording device 11 is not limited to a line printer and may be a serial printer or a page printer. In a case where the recording device 11 is a serial printer, the recording device 11 includes a carriage at which the ejecting unit 20H is mounted, the ejecting unit 20H ejects a liquid toward the medium M supported by the support portion in the course in which the carriage moves in a scanning direction, and thus recording is performed on the medium M.

The recording device 11 is not limited to an ink-jet printer. The ejecting unit 20H may be a dispenser ejecting a first liquid, instead of an ink-jet recording head.

The recording device 11 is not limited to a multifunction machine and may be a printer not including the image reading unit 13.

Hereinafter, technical concepts and working effects thereof that are derived from the above-described embodiment and modifications will be described.

(A) A recording device includes a recording unit configured to perform recording on a medium by ejecting a liquid from an ejecting unit, a support portion configured to support the medium at a position facing the recording unit, a moving mechanism configured to move at least one of the recording unit or the support portion with respect to the other in a movement direction, a cleaning unit provided in a manner movable forward and backward with respect to a position between the recording unit and the support portion in a first direction intersecting the movement direction, the cleaning unit being configured to, when the recording unit is located at a to-be-cleaned position, start moving from a non-cleaning region and move in a cleaning region in the first direction, thereby cleaning the ejecting unit, and a restriction portion configured to restrict movement of the cleaning unit located in the non-cleaning region to the cleaning region when the cleaning unit does not perform cleaning.

According to this configuration, when the cleaning unit does not perform cleaning, the restriction portion can restrict entering of the cleaning unit into a movement region of at least one of the recording unit or the support portion. Thus, it is possible to avoid collision between at least one of the recording unit or the support portion and the cleaning unit. Accordingly, it is possible to avoid a fault caused by contact between at least one of the recording unit or the support portion and the cleaning unit.

(B) The recording device may further include a cap portion provided in a manner movable forward and backward with respect to a position between the recording portion and the support portion in a second direction intersecting the movement direction, the cap portion being configured to cover the ejecting unit when the recording unit is located at a retraction position, wherein the restriction portion may be provided at the cap portion and may restrict movement of the cleaning unit when the cap portion is at a cap position at which the cap portion covers the ejecting unit.

According to this configuration, when the cap portion is disposed at a position facing the recording unit, the cleaning unit can be prevented from entering the movement region MA0 (cleaning region WA) of the recording unit 20. Thus, the restriction portion has a simpler configuration than in a case where a dedicated restriction portion is configured to be moved forward and backward.

(C) In the recording device, at least a part of a first movement region in which the cap portion moves and at least a part of a second movement region in which the cleaning unit moves may be disposed at positions overlapping each other at least partially in the movement direction, and the restriction portion may be a rib included in the cap portion at a position facing the cleaning unit.

According to this configuration, the rib provided at the cap portion comes into contact with the cleaning unit, which thus can restrict movement of the cleaning unit. Due to the arrangement of the rib, the device can be configured with the device size maintained in the movement direction of the cleaning unit, and thus the device can be achieved with a related-art device size. In addition, the initialization operation of initializing the position of the movable body including at least the cleaning unit can be eliminated. This makes it possible to configure the recording device without affecting the throughput of print start after power-on.

(D) In the recording device, the rib may include a guide surface configured to prevent movement of the cap portion from being blocked by contact between the rib and the cleaning unit when the cap portion moves from a retraction position to the cap position facing the ejecting unit.

According to this configuration, when the cap portion performs capping for covering the ejecting unit, it is possible to suppress a case in which the cap portion interferes with the cleaning unit and its movement is blocked.

(E) In the recording device, the cap portion may include a first member made of resin, and the rib may be formed integrally with the first member.

According to this configuration, the restriction portion can be configured without increase in the number of components. Thus, the assembly man-hours of the cleaning unit does not increase, and a positional variation of the rib is suppressed to be small. Components of the cleaning unit can be easily replaced at the time of maintenance.

(F) In the recording device, the cleaning unit may include a second member made of resin, and the rib may restrict movement of the cleaning unit to the cleaning region by coming into contact with the second member.

According to this configuration, due to the configuration in which the rib made of resin and the resin portion of the cleaning unit come into contact with each other, the resins come into contact with each other and slide along each other, which thus can eliminate, for example, lubricating oil. Since the lubricating oil is not used, there is no possibility that the lubricating oil flows into the recording region to cause a printing failure. Necessary durability can be obtained without maintenance such as application of lubricant.

(G) The recording device may further include a driving unit configured to drive the cleaning unit, a primary shaft configured to guide the cleaning unit, and a secondary shaft at a side opposite to the primary shaft, the secondary shaft being configured to guide the cleaning unit, wherein, of the primary shaft and the secondary shaft, the driving unit may be provided at a side of the primary shaft, and a restriction position at which the cleaning unit comes into contact with the restriction portion may be closer to the primary shaft than to the secondary shaft.

According to this configuration, it is possible to suppress inclination of the posture of the cleaning unit when the restriction portion and the cleaning unit collide with each other. Since the cleaning unit can be held in the correct posture while the movement of the cleaning unit is restricted, the ejecting unit can be appropriately cleaned.

(H) In the recording device, the cap portion may be configured to be removed in a removal direction intersecting a guide rail configured to guide movement in the second direction, and the restriction portion may be located at a side in the removal direction with respect to the guide rail in a state where the cap portion is mounted at the guide rail.

According to this configuration, the cap portion can be easily attached to and detached from the guide rail even when the restriction portion is provided. That is, the ease of attachment and detachment of the cap portion is not impaired even when the restriction portion is provided.

(I) The recording device may include an abnormality detecting unit configured to detect an abnormality, wherein a position detection operation of detecting a position of the cleaning unit may be performed when the abnormality is detected, and the position detection operation of the cleaning unit need not be performed when power is switched from OFF to ON.

According to this configuration, since the position detection operation of the cleaning unit is performed when an abnormality occurs, the correct position of the cleaning unit can be acquired. Since the position detection operation of the cleaning unit is omitted when the power is switched from OFF to ON, recording on the medium can immediately start after power-on, which thus can suppress deterioration of throughput.

(J) In the recording device, the movement direction may be a direction including a vertical direction component, and the cleaning unit may move in a horizontal direction as the first direction.

According to this configuration, since the movement direction of the cleaning unit is the horizontal direction and includes no vertical direction component, the cleaning unit does not return to the retraction position by its own weight once the cleaning unit has moved due to a vibration or an operation error. Since movement of the cleaning unit having such a configuration is also restricted by the restriction portion, the cleaning unit can avoid collision with at least one of the recording unit or the support portion.

(K) In the recording device, the movement direction may be a direction including a vertical direction component, the cleaning unit may move in a horizontal direction as the first direction, and the second direction in which the cap portion moves may be a direction including a vertical direction component.

According to this configuration, since the cleaning unit that has moved does not return to the retraction position by its own weight, a problem of collision may occur once the cleaning unit has moved. Even in such a configuration, since the restriction portion restricts movement of the cleaning unit, the cleaning unit can be prevented from colliding with at least one of the recording unit or the support portion.

What is claimed is:

1. A recording device comprising:

a recording unit configured to perform recording on a medium by ejecting a liquid from an ejecting unit;

a support portion configured to support the medium at a position facing the recording unit;

a moving mechanism configured to move at least one of the recording unit or the support portion with respect to the other in a movement direction;

a cleaning unit provided in a manner movable forward and backward with respect to a position between the recording unit and the support portion in a first direction intersecting the movement direction, the cleaning unit being configured to, when the recording unit is located at a to-be-cleaned position, start moving from a non-cleaning region and move in a cleaning region in the first direction, thereby cleaning the ejecting unit;

a restriction portion configured to restrict movement of the cleaning unit located in the non-cleaning region to the cleaning region when the cleaning unit does not perform cleaning; and a cap portion provided in a manner movable forward and backward with respect to a position between the recording portion and the support portion in a second direction intersecting the movement direction, the cap portion being configured to cover the ejecting unit when the recording unit is located at a retraction position, wherein at least a part of a first movement region in which the cap portion moves and at least a part of a second movement region in which the cleaning unit moves are disposed at positions overlapping each other at least partially in the movement direction and the restriction portion is a rib included in the cap portion at a position facing the cleaning unit.

2. The recording device according to claim 1, wherein the restriction portion is provided at the cap portion and restricts movement of the cleaning unit when the cap portion is at a cap position at which the cap portion covers the ejecting unit.

3. The recording device according to claim 2, wherein the cap portion is configured to be removed in a removal direction intersecting a guide rail configured to guide movement in the second direction and the restriction portion is located at a side in the removal direction with respect to the guide rail in a state where the cap portion is mounted at the guide rail.

4. The recording device according to claim 2, wherein the movement direction is a direction including a vertical direction component, the cleaning unit moves in a horizontal direction as the first direction, and the second direction in which the cap portion moves is a direction including a vertical direction component.

5. The recording device according to claim 1, wherein the rib includes a guide surface configured to prevent movement of the cap portion from being blocked by contact between the rib and the cleaning unit when the cap portion moves from a retraction position to the cap position facing the ejecting unit.

6. The recording device according to claim 5, wherein the cap portion includes a first member made of resin and the rib is formed integrally with the first member.

7. The recording device according to claim 6, wherein the cleaning unit includes a second member made of resin and the rib restricts movement of the cleaning unit to the cleaning region by coming into contact with the second member.

8. The recording device according to claim 1, further comprising:

a driving unit configured to drive the cleaning unit;

a primary shaft configured to guide the cleaning unit; and a secondary shaft at a side opposite to the primary shaft, the secondary shaft being configured to guide the cleaning unit, wherein of the primary shaft and the secondary shaft, the driving unit is provided at a side of the primary shaft and a restriction position at which the cleaning unit comes into contact with the restriction portion is closer to the primary shaft than to the secondary shaft.

9. The recording device according to claim 1, further comprising an abnormality detecting unit configured to detect an abnormality, wherein a position detection operation of detecting a position of the cleaning unit is performed when the abnormality is detected and the position detection operation of the cleaning unit is not performed when power is switched from OFF to ON.

10. The recording device according to claim 1, wherein the movement direction is a direction including a vertical direction component and the cleaning unit moves in a horizontal direction as the first direction.

11. A recording device comprising:

a recording unit configured to perform recording on a medium by ejecting a liquid from an ejecting unit;

a support portion configured to support the medium at a position facing the recording unit;

a moving mechanism configured to move at least one of the recording unit or the support portion with respect to the other in a movement direction;

a cleaning unit provided in a manner movable forward and backward with respect to a position between the recording unit and the support portion in a first direction intersecting the movement direction, the cleaning unit being configured to, when the recording unit is located at a to-be-cleaned position, start moving from a non-cleaning region and move in a cleaning region in the first direction, thereby cleaning the ejecting unit;

a restriction portion configured to restrict movement of the cleaning unit located in the non-cleaning region to the cleaning region when the cleaning unit does not perform cleaning;

a driving unit configured to drive the cleaning unit;

a primary shaft configured to guide the cleaning unit; and a secondary shaft at a side opposite to the primary shaft, the secondary shaft being configured to guide the cleaning unit, wherein of the primary shaft and the secondary shaft, the driving unit is provided at a side of the primary shaft, and a restriction position at which the cleaning unit comes into contact with the restriction portion is closer to the primary shaft than to the secondary shaft.

12. A recording device comprising:

a recording unit configured to perform recording on a medium by ejecting a liquid from an ejecting unit;

a support portion configured to support the medium at a position facing the recording unit;

a moving mechanism configured to move at least one of the recording unit or the support portion with respect to the other in a movement direction;

a cleaning unit provided in a manner movable forward and backward with respect to a position between the recording unit and the support portion in a first direction intersecting the movement direction, the cleaning unit being configured to, when the recording unit is located at a to-be-cleaned position, start moving from a non-cleaning region and move in a cleaning region in the first direction, thereby cleaning the ejecting unit;

a restriction portion configured to restrict movement of the cleaning unit located in the non-cleaning region to the cleaning region when the cleaning unit does not perform cleaning; and an abnormality detecting unit configured to detect an abnormality, wherein a position detection operation of detecting a position of the cleaning unit is performed when the abnormality is detected, and the position detection operation of the cleaning unit is not performed when power is switched from OFF to ON.

* * * * *